US010115199B2

(12) United States Patent
Patnaik

(10) Patent No.: US 10,115,199 B2
(45) Date of Patent: *Oct. 30, 2018

(54) IMAGE BASED OBJECT LOCATOR

(71) Applicant: Decision Sciences International Corporation, Poway, CA (US)

(72) Inventor: Rohit Patnaik, Carlsbad, CA (US)

(73) Assignee: Decision Sciences International Corporation, Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/876,380

(22) Filed: Oct. 6, 2015

(65) Prior Publication Data

US 2016/0104290 A1 Apr. 14, 2016

Related U.S. Application Data

(60) Provisional application No. 62/061,651, filed on Oct. 8, 2014.

(51) Int. Cl.
*G06T 7/00* (2017.01)
*G06K 9/20* (2006.01)
(Continued)

(52) U.S. Cl.
CPC .......... *G06T 7/0042* (2013.01); *G01V 5/0016* (2013.01); *G06K 9/2054* (2013.01);
(Continued)

(58) Field of Classification Search
CPC .. G01V 5/0016; G01V 5/0025; G01V 5/0041; G06T 7/155; G06T 5/30;
(Continued)

(56) References Cited

U.S. PATENT DOCUMENTS 8,247,767 B2    8/2012   Morris et al.
2002/0015517 A1 2/2002   Hwang et al.
(Continued)

FOREIGN PATENT DOCUMENTS

WO    2015/171943 A1    11/2015

OTHER PUBLICATIONS

Borozdin, K. N., et al., "Surveillance: Radiographic Imaging with Cosmic Ray Muons," Nature, 422:277-278, Mar. 2003.

(Continued)

*Primary Examiner* — Jingge Wu
(74) *Attorney, Agent, or Firm* — Perkins Coie LLP

(57) ABSTRACT

Techniques, systems, and devices are disclosed for analyzing a reconstructed charged particle image of a volume of interest from charged particle detector measurements to determine a location and boundaries of one or more objects or an orientation of the one or more objects. The technique can include performing a segmentation operation on the reconstructed charged particle image of the volume. The segmentation operation identifies a subset of a set of voxels of the image of the volume as object candidate voxels. The technique can include locating corners of the one or more objects to determine the location, boundaries, or the orientation of the one or more objects. The technique can also include the computation of the center of mass of the one or more objects. The technique can include performing a morphological operation on the image and can include performing a connected-component analysis on the identified object-candidate voxels.

17 Claims, 14 Drawing Sheets

(51) Int. Cl.
*G06K 9/44* (2006.01)
*G06K 9/62* (2006.01)
*G06T 5/30* (2006.01)
*G06T 11/00* (2006.01)
*G01V 5/00* (2006.01)
*G06T 7/73* (2017.01)
*G06T 7/12* (2017.01)
*G06T 7/155* (2017.01)

(52) U.S. Cl.
CPC ............ *G06K 9/44* (2013.01); *G06K 9/6267* (2013.01); *G06T 5/30* (2013.01); *G06T 7/12* (2017.01); *G06T 7/155* (2017.01); *G06T 7/73* (2017.01); *G06T 11/008* (2013.01); *G06T 2207/10072* (2013.01); *G06T 2207/20036* (2013.01); *G06T 2207/30112* (2013.01)

(58) Field of Classification Search
CPC . G06T 7/0042; G06T 7/11; G06T 7/12; G06T 7/73; G06K 9/2054; G06K 9/44; G06K 9/6267
See application file for complete search history.

(56) References Cited

U.S. PATENT DOCUMENTS

| | | | |
|---|---|---|---|
| 2004/0252870 A1 | 12/2004 | Reeves et al. | |
| 2006/0209063 A1 | 9/2006 | Liang et al. | |
| 2006/0233302 A1* | 10/2006 | Might | G01N 23/04 378/57 |
| 2007/0047840 A1 | 3/2007 | Xu et al. | |
| 2008/0228418 A1* | 9/2008 | Green | G01N 23/20 702/81 |
| 2008/0315091 A1* | 12/2008 | Morris | G01T 1/18 250/307 |
| 2009/0116766 A1* | 5/2009 | Matsumoto | G06K 19/00 382/311 |
| 2009/0226060 A1* | 9/2009 | Gering | G06T 7/11 382/128 |
| 2009/0295576 A1 | 12/2009 | Shpantzer et al. | |
| 2010/0040192 A1 | 2/2010 | Zhang et al. | |
| 2010/0046704 A1 | 2/2010 | Song et al. | |
| 2010/0090097 A1 | 4/2010 | Koltick | |
| 2011/0216945 A1* | 9/2011 | Jaenisch | G01V 5/0008 382/104 |
| 2011/0248163 A1* | 10/2011 | Morris | G01N 23/046 250/307 |
| 2012/0056995 A1* | 3/2012 | Dedeoglu | G01S 11/12 348/47 |
| 2013/0238291 A1 | 9/2013 | Schultz et al. | |
| 2013/0294574 A1 | 11/2013 | Peschmann | |
| 2014/0247987 A1* | 9/2014 | Nomoto | G06K 9/00805 382/173 |
| 2014/0254920 A1* | 9/2014 | Xu | G06T 5/002 382/154 |
| 2014/0294147 A1 | 10/2014 | Chen et al. | |
| 2014/0319365 A1* | 10/2014 | Sossong | G01V 5/0016 250/394 |
| 2014/0332685 A1 | 11/2014 | Anghel et al. | |
| 2015/0212014 A1* | 7/2015 | Sossong | G01V 5/0016 250/394 |
| 2015/0220814 A1* | 8/2015 | Verkasalo | G06Q 20/322 382/103 |
| 2015/0241593 A1* | 8/2015 | Blanpied | G01V 5/0016 250/307 |
| 2015/0325013 A1* | 11/2015 | Patnaik | G06T 7/11 345/424 |
| 2016/0041297 A1* | 2/2016 | Blanpied | G01V 5/005 250/358.1 |
| 2016/0061752 A1* | 3/2016 | Kurnadi | G01V 5/0016 250/395 |

OTHER PUBLICATIONS

Eddins, S., "Connected component labeling," retrieved from https://blogs.mathworks.com/steve/2007/05/11/connected-component-labeling-part-5/, May 2007.
International Search Report and Written Opinion dated Aug. 12, 2015 for International Application No. PCT/US2015/029769, filed on May 7, 2015 (8 pages).
International Search Report and Written Opinion dated Dec. 29, 2015 for International Application No. PCT/US2015/054266, filed on Oct. 6, 2015 (9 pages).
Patnaik, R., et al., "Image Based Object Identification in Muon Tomography," 2014 IEEE Nuclear Science Symposium and Medical Imaging Conference (NSS/MIC), 11 pages, Nov. 2014.
Pesente, S., et al. "First results on material identification and imaging with a large-volume muon tomography prototype," Nuclear Instruments and Methods in Physics Research Section A: Accelerators, Spectrometers, Detectors and Associated Equipment, 604(3):738-746, Jun. 2009.

* cited by examiner

IMAGE BASED OBJECT LOCATOR

CROSS REFERENCE TO RELATED APPLICATIONS

This patent document claims the benefit of priority of U.S. Provisional Patent Application No. 62/061,651, filed on Oct. 8, 2014. The entire content of the before-mentioned patent application is incorporated by reference as part of the disclosure of this document.

TECHNICAL FIELD

The subject matter described in this disclosure generally relates to systems, devices, and processes for inspecting objects (e.g., cargos or containers) and other volumes for detecting certain substances or items e.g., prohibited items including explosives, weapons, and nuclear materials.

BACKGROUND

Cosmic ray imaging and sensing are techniques which exploit the multiple Coulomb scattering of highly penetrating cosmic ray-produced charged particles such as muons to perform non-destructive inspection of the material without the use of artificial radiation. The Earth is continuously bombarded by energetic stable particles, mostly protons, coming from deep space. These particles interact with atoms in the upper atmosphere to produce showers of particles that include many short-lived pions which decay producing longer-lived muons. Muons interact with matter primarily through the Coulomb force having no nuclear interaction and radiating much less readily than electrons. Such cosmic ray-produced charged particles slowly lose energy through electromagnetic interactions. Consequently, many of the cosmic ray produced muons arrive at the Earth's surface as highly penetrating charged radiation. The muon flux at sea level is about 1 muon per $cm^2$ per minute.

As a muon moves through a material, Coulomb scattering off of the charges of sub-atomic particles perturb the muon's trajectory. The total deflection depends on several material properties, but the dominant effects are the atomic number, Z, of nuclei and the density of the material. The trajectories of muons are more strongly affected by materials that make good gamma ray shielding, such as lead and tungsten, and by special nuclear materials (SNM), such as uranium and plutonium, than by materials that make up more ordinary objects such as water, plastic, aluminum and steel. Each muon carries information about the objects that the muon has penetrated. The scattering of multiple muons can be measured and processed to probe the properties of the objects penetrated by the muons. A material with a high atomic number Z and a high density can be detected and identified when the material is located inside low-Z and medium-Z matters. In addition to muons, cosmic rays also generate electrons. Electrons are less massive and generally have lower momenta than muons and hence scatter more in a given material. Due to their larger scattering, electrons can be used to differentiate materials and particularly materials with low to medium Z and densities that may not significantly scatter muons.

Coulomb scattering from atomic nuclei in a material results in a very large number of small angle deflections of charged particles as the charged particles transit the material. In some examples, a correlated distribution function can be used to approximately characterize the displacement and angle change of the trajectory that depends on the density and the atomic charge of the material. As an example, this distribution function can be approximated as a Gaussian distribution. The width of the distribution function is proportional to the inverse of the momentum of the particle and the square root of the real density of material measured in radiation lengths. The correlated distribution function of cosmic ray-produced charged particles (e.g., muons and electrons) can provide information on materials in the paths of the cosmic ray-produced charged particles with no radiation dose above the Earth's background and proper detection of such cosmic ray-produced charged particles can be implemented in a way that is especially sensitive to selected materials to be detected such as good radiation shielding materials.

In some examples of cosmic ray imaging and sensing, a muon tomography system can be configured to perform tomography of a target object under inspection, such as cargo in a truck, based on scattering of cosmic ray-produced charged particles by the target object. For example, cosmic ray tomography systems can be used for detecting certain targeted objects, e.g., such as materials that can be used to threaten the public, including smuggled nuclear materials. Cosmic ray tomography detector systems can be used jointly with or an alternative to other nuclear material detectors such as gamma or X-ray detectors. Gamma and X-ray detectors operate by directing Gamma and X-ray radiation to a target and measuring penetrated Gamma and X-ray radiation. Shielding of nuclear materials can reduce the count rates in the Gamma and X-ray detectors and reduce the detection performance of Gamma and X-ray detectors. Cosmic ray tomography detection systems can detect shielded nuclear materials and objects.

An exemplary cosmic ray charged particle tomography detection system can include cosmic ray-produced charged particle detectors to detect and track ambient cosmic ray-produced charged particles, such as muons and electrons traversing through a volume of interest (VOI). The cosmic ray produced charged particle detectors can include an array of drift-tube sensors to enable tomographic imaging of the VOI. Cosmic ray-produced charged particles, e.g., primarily muons and electrons, shower through the VOI, and measurement of individual cosmic ray-produced charged particle tracks can be used to reconstruct the three-dimensional distribution of atomic number (Z) and density of materials in the VOI using cosmic ray-produced charged particle scattering. However, the extent and orientation of any objects placed in the detector may be unknown.

SUMMARY

Disclosed are techniques, systems, and devices for analyzing a content of a volume, such as a cargo, or container, or a package based on images obtained from cosmic ray-produced charged particle detector measurements (as charged cosmic ray-produced particles including muons and electrons passing through the volume) to detect certain targeted substances or objects/items that are present inside the volume or one or more objects under inspection. Object features (e.g., the extent of the object and the orientation) are extracted from the detected objects based at least on the objects' statistical and geometric/or properties.

The detection or imaging techniques performed by cosmic ray-produced charged particle detection systems disclosed in this patent document can be entirely passive, e.g., relying on natural, ambient cosmic rays and on natural emission of gamma rays or induced emission of neutrons from materials of one or more target objects. Because of the passive nature, the disclosed of the cosmic ray-produced charged particle detection systems can be referred to as a Multi-Mode Passive Detection System (MMPDS). As used in this patent document, the term detection system can be used interchangeably with the term Multi-Mode Passive Detection System (MMPDS) when describing a passive system. The MMPDS can include multiple drift tubes, with each drift tube including a sealed ionized chamber having a coaxial transmission line and filled with a mixture of low-pressure gasses. The drift tubes of the MMPDS can be used to sense cosmic-ray muons and may also be used to sense cosmic-ray electrons. For example, the MMPDS based passive detector (based PSDV) may utilize charged particles to reconstruct a detector image volume using muon tomography. The reconstructed volume image from the detection system can be used to identify one or more objects (e.g., a package or a container or an inspection object) within a volume scanned by the detection system, detect the scanned volume's contents including contraband substances (e.g., such as materials that can be used to threaten the public, including smuggled nuclear materials) in the volume, determine the location, corners, boundaries, or orientation of the identified one or more objects in the volume scanned, or a combination of any of these properties.

The reconstructed volume can be analyzed to identify the extents of a container (for example, the container of an object may be a truck and the extents of the container may include other parts such as the wheels of the truck, etc.) placed in the volume scanned the detection system. Identifying the extents of a container scanned can enable automated inspection of the scanned container (e.g., the truck container) and the one or more objects inside the container (e.g., cargo). Automated inspection of containers as described can be important at least because the scanned one or more containers or one or more objects may not always be in a predefined location or coordinates (e.g., the truck may not always stop at the same location or coordinates). In addition, automated inspection of containers as described can be important to determine, using the detection system, the correct orientation of the one or more containers or one or more objects within the container (e.g., the correct orientation of the truck container and the cargo within the truck). For example, the one or more container or one or more objects within the container (e.g., the truck container and the cargo within the truck) may be at an angle to the coordinate system of the detector and possibly also at different angles with respect to each other. The reconstructed image of the scanned volume can contain all of the information for the container (e.g., truck container). Locating the container can enable determination of the physical bounds of the inspection volume (i.e., the volume that is being detected by the detection system).

In addition, features of a package in the scanned volume can be calculated for any package or packages being inspected by the detection system. The reconstructed image of the scanned volume can be analyzed to determine the locations of the extents of the package. The package may not always be at a predefined location, in a predefined orientation, or at a predefined set of coordinates. In addition, the oriented extents of the package (i.e., the orientation of the package) can be determined so that the package can be effectively analyzed. The boundaries of the package, or object within the package can be the smallest (or tightest) box enclosing the package/object, and the bounds of the package/object can be defined by eight or more vertices. Due to the shape of the package/object, the bounding box may not always be the smallest possible bounding box, but may be close to the smallest possible bounding box.

For example, using image processing/computer vision techniques such as image segmentation, binary and gray-scale morphological analysis, and connected-component analysis, the container (e.g., the truck container) or the package or inspection object within the reconstructed volume from the detector may be detected and separated from the full detector volume. In particular, edge finding algorithms can be used to find the edges where there are sharp transitions from background to find the container (e.g., the truck container) or the package or inspection object. The extents of the container or package or inspection object can be located by determining the locations of the edges of the container or package or inspection object and by determining the locations of the corners of the container or package or inspection object based on the locations of the edges. The orientation of the container or package or inspection object can be computed, e.g., based on the locations of the edges. Object features (e.g., the features of the object(s) within the container or the package) can be extracted from the detected objects. The extracted object features may then used by the classifier to determine whether a given object is benign or a threat.

In connected component analysis, labeling using a structuring element (or kernel) in a shape of a sphere or cube or other shapes can be used to ensure the connectedness of each voxel to adjacent voxels. In addition, relabeling can be performed later for convenient analysis. Other structuring elements and sizes of structuring elements can be used depending on particular situations to isolate and label particular objects or to remove specific noise or voxel sizes. For example, a sphere of an appropriate size can be used on a minimum size of target objects to be detected. The sphere of an appropriate size can be based on the size of the voxels. However, other sizes of shapes such as spheres as well as other configurations may be used in differing situations. In some implementations, the structuring elements or the size of the structuring elements can be adjusted for noise in the detection system. Adjusting the structuring elements or the size of the structuring elements can enable the removal of parts of the reconstructed volume including the container (e.g., the truck container) or the package or inspection object. Moreover, the type and size of the structuring element used and the removal of parts of the reconstructed volume can affect the location algorithms used in the present disclosure. Although the connected component analysis used in the present disclosure may make use of full connectedness for voxels and adjacent voxels, partial connectedness can also yield reasonable results.

Techniques, systems, and devices are disclosed for analyzing a reconstructed charged particle image of a volume of interest from charged particle detector measurements to determine the location, corners, and boundaries of a container or package object or the orientation of the container or package object within the volume of interest, or a combination of these properties.

In one aspect, an image of a volume (e.g., an image of the volume scanned by the detection system that includes the container or the package or inspection object) can be reconstructed from the detector measurements of the cosmic ray-produced charged particles (e.g., the measurements of the scattering and stopping properties of muons) passing through the volume. The reconstructed charged particle image of the volume, which can also be referred to as a reconstructed volume, can be divided or partitioned into voxels with each voxel having an intensity value. In some cases, the reconstructed image of the volume can be preprocessed to enhance the image or to prepare for better detection of objects within the volume. In some cases, gradient smoothing can be used to enhance the image of the volume. The intensity value of each voxel can be computed and derived from the charged particles passing through the voxel and from detector measurements.

In an aspect, a technique can be used by the detection system to perform a segmentation operation on the reconstructed charged particle image of the volume. The segmentation operation can identify a subset of a set of voxels of the image of the volume as object candidate voxels. The segmentation operation can involve using a high threshold and a low threshold to label each voxel as either an object-candidate voxel or a non-object voxel analysis respectively. The technique can be used to locate the corners of the object and to determine the location, corners, and boundaries, or orientation of the container or package object, or a combination of these properties. The technique can be used to perform a morphological operation on the image and can be used to perform a connected-component analysis on the identified object-candidate voxels. The morphological operation can include applying a sequence of morphological dilation operations and morphological erosion operations to the voxels. The technique can be used to determine a relative position of some parts of the container or package object relative to other parts of the container or package object. The technique can be used to find the edges of or determine the locations of fiducials of the container or package object.

In an aspect, a detection system (e.g., a cosmic ray-produced charged particle detection system) can include a processor, a memory, and an image processing mechanism coupled to the processor and the memory. The image processing mechanism can perform the image processing technique described above.

These and other aspects are described below in the drawings, the description and the claims.

DETAILED DESCRIPTION

Figure 1:
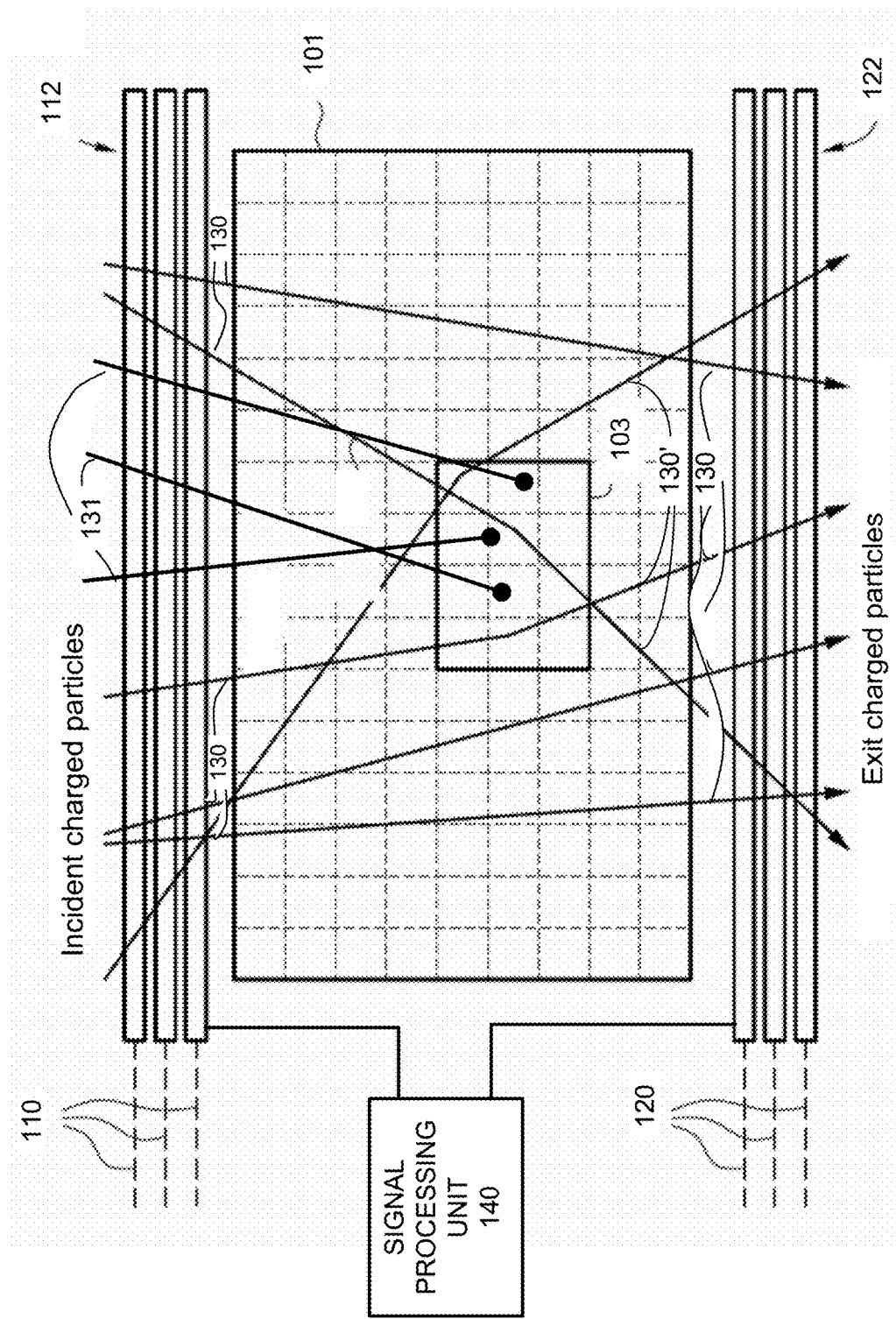
FIG. 1 shows an exemplary cosmic-ray particle tomography system.

In cosmic ray imaging and sensing, a tomography system can perform tomography of a target volume that includes one or more objects under inspection based on scattering of cosmic ray-produced charged particles by the target volume or one or more objects within the target volume. For example, muon tomography systems can be used for detecting certain targeted objects, such as materials that can be used to threaten the public, including smuggled nuclear materials. Cosmic ray tomography systems can be used jointly with or as an alternative to other nuclear material detectors such as gamma or X-ray detectors. Gamma and X-ray detectors operate by directing Gamma and X-ray radiation to a target and measuring penetrated Gamma and X-ray radiation. Shielding of nuclear materials can reduce the count rates in the Gamma and X-ray detectors and reduce the detection performance of Gamma and X-ray detectors. Cosmic ray tomography detection systems can detect shielded nuclear materials and objects.

In an example of a muon tomography detection system, muon detectors can include arrays of drift-tube sensors to enable tomographic imaging of a volume of interest (VOI) using ambient cosmic rays as the illuminating radiation source. Cosmic ray charged particles, e.g., primarily muons and electrons, shower through the VOI, and measurement of individual particle tracks can be used to reconstruct the three-dimensional distribution of atomic number (Z) and density of materials in the VOI using particle scattering.

Disclosed are techniques, systems, and devices for analyzing a reconstructed image of the volume or a "reconstructed volume," such as a cargo volume, from cosmic ray charged particle detector measurements (as cosmic ray charged particles passing through the volume) to detect objects from the reconstructed volume. Object features (e.g., the location, corners, and boundaries, or orientations of the object, or a combination of these properties) are extracted from the detected objects based on the object's statistical and geometric properties. The extracted object features are used by a classifier to determine whether a detected object is benign or a threat.

Cosmic ray-produced charged particles (such as electrons and muons) passing through a VOI associated with an object can interact with the object by scattering from the atoms of the object and by being absorbed by the atoms of the object ("stopping"). A technique relying primarily on the muon component of cosmic rays can be used to interrogate a Volumes of Interest (VOI). Because muons are highly energetic and massive, muons can pass essentially un-scattered through materials of light atomic mass and are typically only weakly scattered by conventional metals used in industry (e.g., aluminum, iron, steel, and the like). Substantial scattering and absorption generally only occur when muons encounter sufficient thicknesses of heavy elements such as lead and tungsten, and special nuclear materials (SNM), such as uranium and plutonium.

Techniques can be implemented to construct relationship between scattering and stopping of cosmic-ray produced charged particles over a wide range of atomic masses and material densities. By combining the scattering and stopping responses of both muons and electrons, the range of material detection and characterization can be extended beyond special nuclear materials (SNM) to cover other types of contraband.

In some implementations, comparison of the stopping and scattering signals in the VOI can allow for the identification of materials in the VOI, or for the classification of the materials as low, medium or high density. In addition, the stopping signal can be used to estimate a thickness of the detected material.

The cosmic-ray produced charged particle detection systems and associated methods described in this patent document can be implemented to detect presence of certain objects or materials such as nuclear materials and to obtain tomographic information of such objects in various applications including but not limited to inspecting packages, containers, occupied vehicles at security check points, border crossings and other locations for nuclear threat objects that may range from fully assembled nuclear weapons to small quantities of highly shielded nuclear materials. Features described in this patent document can be used to implement various particle detection systems.

For example, a particle detection system can include an object holding area for placing an object to be inspected, a first set of position sensitive cosmic-ray produced charged particle detectors located on a first location with respect to the object holding area to measure positions and directions of incident cosmic-ray produced charged particles entering the object holding area, a second set of position sensitive cosmic-ray produced charged particle detectors located on a second location with respect to the object holding area opposite to the first location to measure positions and directions of outgoing cosmic-ray particle exiting the object holding area, and a signal processing unit, which can include, e.g., a microprocessor, to receive data of measured signals associated with the incoming charged particles from the first set of position sensitive cosmic-ray produced charged particle detectors and measured signals associated with the outgoing cosmic-ray particle from the second set of position sensitive cosmic ray produced charged particle detectors. As an example, each of the first and second sets of cosmic ray produced charged particle detectors can be implemented to include drift tubes arranged to allow at least three cosmic ray produced charged particle positional measurements in a first direction and at least three cosmic ray produced charged particle positional measurements in a second direction different from the first direction. The signal processing unit can analyze scattering behaviors of the cosmic-ray produced charged particles caused by scattering of the cosmic-ray produced charged particles in the object placed within the object holding area based on the measured incoming and outgoing positions and directions of cosmic-ray produced charged particles to obtain a tomographic profile or the spatial distribution of scattering centers within the object holding area.

The obtained tomographic profile or the spatial distribution of scattering centers can be used to reveal the presence or absence of one or more objects in the object holding area and possibly the location and boundaries (extents) of the one or more objects and orientations of the one or more objects. In addition, objects made with particular materials or devices, such as materials with high atomic numbers including nuclear materials or devices, may be detected. Each position sensitive cosmic ray produced charged particle detector can be implemented in various configurations, including drift cells such as drift tubes filled with a gas which can be ionized by cosmic ray produced charged particles. Such a system can be used to utilize naturally occurring cosmic-ray produced charged particles as the charged particle source for detecting one or more objects in the object holding area.

In applications for portal monitoring, the illustrative embodiments provide an approach to enable robust nuclear material detection at reduced cost and with increased effectiveness. Furthermore, the approach can provide a radiation portal monitor which is capable of determining whether a given vehicle or cargo is free of nuclear threats by both measuring the absence of a potential shielded package and the absence of a radiation signature.

The portal monitoring systems of the illustrative embodiments shown in the accompanying drawings employ cosmic ray-produced charged particle tracking with drift tubes. As will be explained in more detail below, the portal monitoring systems utilize drift tubes to enable tracking of cosmic ray produced charged particles, such as muons and electrons, passing through a volume as well as detection of gamma rays. Advantageously, these portal monitoring systems can effectively provide the combined function of a cosmic ray radiography apparatus with passive or active gamma radiation counter to provide a way to determine the location, corners, and boundaries, or an orientation of an object scanned by the detection system, or a robust detection system for nuclear threats, or a combination of these properties. This eliminates the need for two separate instruments.

Cosmic ray-produced muons and electrons can provide information with no radiation dose above the earth's background and proper detection of such cosmic ray-produced muons and electrons can be implemented in a way that is especially sensitive to good shielding materials. A passive detection system can perform tomography of a target object under inspection based on scattering or stopping of muons and electrons by the target object. For example, the passive detection system can perform tomography to localize scattering (RC & LS). The tomographic position resolution can be expressed approximately as follows:

$$\Delta x = \theta_{RMS} L$$

where:

$\theta_{RMS}$=the root-mean-square (rms) of the scattering angle, and

L=the size of the volume under the detection by the detection apparatus or system.

For example, for an exemplary rms scattering angle of 0.02 radian and an apparatus size of 200 cm, the tomographic position resolution is 0.02×200 cm=4 cm.

In one approach, the angular resolution is determined by the following equation based on the Poisson statistics:

$$\frac{\Delta \theta}{\theta} = \frac{1}{\sqrt{2N}}$$

where:

θ=the rms scattering angle,

N=number of cosmic ray-produced muons or electrons passing through a region of interest.

For example, the angular resolution for N=100 (corresponding to a 10×10 cm² resolution element after one minute of counting) is Δθ=0.070.

Tomographic methods, designed to construct an image or model of an object from multiple projections taken from different directions, can be implemented in the cosmic ray-based tomographic system to provide a discrete tomographic reconstruction of the volume of interest based on the data provided by the cosmic-ray produced charged particles. In some implementations, Monte Carlo simulation techniques can be used to study applications and shorten scanning times. Other stochastic processing methods may also be used in implementing the cosmic ray-based tomographic imaging described in this patent document.

The cosmic ray radiography function of the charged particle detection systems described in various embodiments can be more readily understood with reference to examples of detection systems adapted to detect cosmic ray-produced charged particles such as those shown in FIG. 1.

Referring initially to FIG. 1, which illustrates a detection system, such as a MMPDS or other charged particle detection system, utilizing cosmic-ray produced charged particles to detect an object, system 100 includes a set of two or more planes 110 of incoming position sensitive charged particle detectors 112 arranged above a volume 101 to be imaged as the first array of detectors for providing the position and angles (i.e., directions in the 3-D space) of incoming charged particle tracks 130 and 131. The incoming position sensitive charged particle detectors 112 can measure the position and angles of incoming charged particle tracks 130 and 131 with respect to two different directions, e.g., in two orthogonal coordinates along x and y axes. Charged particles (e.g., muons and electrons) pass through the volume 101 where the VOI 103 may be located and are scattered to an extent dependent upon the material occupying the volume 103 through which they pass. Another set of two or more planes 120 of outgoing position sensitive charged particle detectors 122 can be positioned as the second array of position sensitive charged particle detectors to record outgoing charged particle positions and directions. The drift tubes in detectors 112 and 122 are arranged to allow at least three charged particle positional measurements in a first direction and at least three charged particle positional measurements in a second direction which is different from the first direction and can be orthogonal to the first direction. As shown in FIG. 1, the first and second arrays of position sensitive charged particle detectors 112 and 122 are positioned above and below the volume 101 respectively to detect and track the incoming and outgoing charged particles respectively. In some implementations, side detectors (not shown) located at two opposite lateral locations with respect to the volume 101 can be used to detect more horizontally orientated muon tracks. The scattering angle of each charged particle is computed from the incoming and outgoing measurements.

A signal processing unit 140, e.g., a computer, is provided in the system 100 to receive data of measured signals of the incoming charged particles by the position sensitive charged particle detectors 112 and outgoing charged particles by the position sensitive charged particle detectors 122. This signal processing unit 140 can analyze the scattering of the charged particles in the volume 101 based on the measured incoming and outgoing positions and directions of charged particles to obtain a tomographic profile or the spatial distribution of the scattering density reflecting the scattering strength or radiation length within the volume 101. The obtained tomographic profile or the spatial distribution of the scattering density within the volume 101 can reveal the contents of the VOI 103 in the volume 101. FIG. 1 shows drift tube detectors 112 and 122 located above and below the volume 101. In some implementations, additional drift tube detectors can be implemented on lateral sides of the volume 101 to form a box or four sided structure into which a package, a vehicle or cargo container can enter for scanning by the detection system.

The signal processing unit 140 of system 100 in FIG. 1 and other systems described in this application can process signals received from the position sensitive cosmic ray charged particle detectors associated with cosmic-ray charged particles traversing through a volume under inspection (e.g., a package, a container or a vehicle) to perform various operations. For example, the signal processing unit 140 can process the signals received from the position sensitive cosmic ray charged particle detectors to reconstruct the trajectory of a cosmic ray charged particle such as a muon or an electron traversing through the volume 101. The signal processing unit 140 can measure the momentum of an incoming cosmic ray charged particle based on signals received from the position sensitive cosmic ray charged particle detectors 112. The signal processing unit 140 can measure the momentum of an outgoing cosmic ray charged particle based on signals received from the position sensitive cosmic ray charged particle detectors 122. The signal processing unit 140 can determine the spatial distribution of the scattering density of the volume 101. Results from the signal processing unit 140 processing the signals received from the position sensitive cosmic ray charged particles can be used to construct the tomographic profile and measure various properties of the volume 101. For example, the process for reconstructing the trajectory of a cosmic ray charged particle traversing or passing through a cosmic ray charged particle detector having a set of drift cells can include obtaining hit signals representing identifiers of drift cells hit by cosmic ray charged particles and corresponding hit times. The cosmic ray charged particle trajectory reconstruction process can include grouping in-time drift cell hits identified as being associated with a track of a particular cosmic ray charged particle passing through the corresponding position sensitive cosmic ray charged particle detector. The cosmic ray charged particle trajectory reconstruction process can include initially estimating a time zero value for a moment of time at which the particular cosmic ray charged particle hits a given drift cell. The cosmic ray charged particle trajectory reconstruction process can include determining drift radii based on estimates of the time zero values, drift time conversion data and the time of the hit. The cosmic ray charged particle trajectory reconstruction process can include fitting linear tracks to drift radii corresponding to a particular time zero value. Also, the cosmic ray charged particle trajectory reconstruction process can include searching and selecting a time-zero value associated with a perceived near best or ideal of the track fits performed for a particular charged particle and computing error in time-zero and tracking parameter. Reconstruction of the track based on the time zero fit provides a reconstructed linear trajectory of the cosmic ray charged particle passing through the position sensitive cosmic ray charged particle detector without having to use fast detectors (such as photomultiplier tubes with scintillator paddles) or some other fast detector which detects the passage of the muon through the apparatus to the nearest few nanoseconds to provide the time-zero.

Also, the processing for measuring the momentum of an incoming or outgoing cosmic ray charged particle based on signals from the position sensitive cosmic ray charged particle detectors (i.e., detector signals) can include, for example, configuring position sensitive cosmic ray charged particle detectors to scatter a cosmic ray charged particle passing through the position sensitive cosmic ray charged particle detectors. The process for measuring the momentum of an incoming or outgoing cosmic ray charged particle based on detector signals include measuring the scattering of a charged particle in the position sensitive detectors. Measuring the scattering can include obtaining at least three positional measurements of the scattering cosmic ray charged particle. The process for measuring the momentum of an incoming or outgoing cosmic ray charged particle based on detector signals include determining at least one trajectory of the cosmic ray charged particle from the positional measurements. The process for measuring the momentum of an incoming or outgoing cosmic ray charged particle based on detector signals include determining at least one momentum measurement of the charged particle from the at least one trajectory. This technique can be used to determine the momentum of the cosmic ray charged particle based on the trajectory of the cosmic ray charged particle. The trajectory of the cosmic ray charged particle is determined from the scattering of the cosmic ray charged particles at the position sensitive cosmic ray charged particle detectors themselves without the use of additional metal plates in the detector.

Also, the spatial distribution of the scattering density of the volume can be determined from cosmic ray charged particle tomographic data by obtaining predetermined cosmic ray charged particle tomography data corresponding to scattering angles and estimated momentum of cosmic ray charged particles passing through object volume. Determining the spatial distribution of the scattering density of the volume from cosmic ray charged particle tomographic data can include providing the probability distribution of charged particle scattering for use in an image reconstruction technique such as an expectation maximization (ML/EM) technique, the probability distribution being based on a statistical multiple scattering model. Also, determining the spatial distribution of the scattering density of the volume from cosmic ray charged particle tomographic data can include determining an estimate of the object volume density, e.g., by determining a substantially maximum likelihood estimate using the expectation maximization (ML/EM) technique. Determining the spatial distribution of the scattering density of the volume from cosmic ray charged particle tomographic data can include outputting reconstructed object volume scattering density. The reconstructed object volume scattering density can be used to identify the presence or type of object occupying the volume of interest from the reconstructed volume density profile. Various applications include cosmic-ray charged particle tomography for various homeland security inspection applications in which vehicles or cargo can be scanned by a charged particle tracker.

The tomographic processing part of the signal processing unit 140 may be implemented in a computer at the same location as the detectors 112 and 122. Alternatively, the tomographic processing part of the signal processing unit 140 may be implemented in a remote computer that is connected on a computer network such as a private network or a public network such as the Internet.

In FIG. 1, incoming cosmic ray charged particle detectors 112 can detect the X-Y position, angle, speed, and momentum of each of the incident cosmic ray charged particles 130 and 131 entering the volume 101, while outgoing cosmic ray charged particle detectors 122 can detect the X-Y position, angle, speed, and momentum of each of the exiting charged particles 130 passing through volume 101. The signal processing unit 140 can process the position, angle, speed, and momentum data collected by position sensitive cosmic ray charged particle detectors 112 and 122 to match each incident charged particle 130 with a corresponding exiting cosmic ray charged particle 130. Also, the signal processing unit 140 can process the position, angle, speed, and momentum data collected by position sensitive cosmic ray charged particle detectors 112 and 122 to identify those exiting cosmic ray charged particles 130 that are scattered by VOI 103, such as cosmic ray charged particles 130', and generate a scattering number for the incident cosmic ray charged particles. The signal processing unit 140 can process the position, angle, speed, and momentum data collected by position sensitive cosmic ray charged particle detectors 112 and 122 to identify incident cosmic ray charged particles 131 stopped inside VOI 103 and generate a stopping number for the incident cosmic ray charged particles.

Further detail of cosmic-ray particle tomography systems which can be used to detect and identify content of a VOI exposed to cosmic ray particles based on the measured scattering and stopping characteristics of the cosmic ray particles is described in U.S. Pat. No. 8,247,767 entitled "PARTICLE DETECTION AND APPLICATIONS IN SECURITY AND PORTAL MONITORING" filed on Oct. 26, 2007, the content of which is incorporated by reference as part of the specification of this application.

Using an above-described cosmic-ray particle detection system, a volume, such as a package, a cargo, a container, or an occupied vehicle, can be reconstructed from the cosmic ray imaging measurements of charged particles including muons passing through the volume. Next, the reconstructed volume may be divided or partitioned into voxels with each voxel having an intensity value. More specifically, the intensity value of each voxel may be computed and derived from the muon detector measurements which can include both scattering and stopping of muons inside the voxel. In one embodiment, the voxel intensity is derived from the scattering density of the muons passing through the voxel. The scatter density may be computed from the momentum, scattering angle, estimated thickness of scatter, and nominal muon scattering angle, and can be expressed as:

$$\text{Scattering density} = \frac{(P^2 * \theta^2)}{L * p_0^2}$$

where, P is the momentum, θ is the scattering angle, L is the estimated thickness of scatter, and $p_o$ is the nominal scattering angle. In addition to the intensity value, each voxel may also be associated with other values, such as a location vector, momentum, and a scattering angle, among others. In some embodiments, the reconstructed volume is preprocessed to enhance the image to prepare for better detection of objects and features within the volume. For example, a gradient smoothing technique may be used for the preprocessing operation.

Next, the reconstructed volume may be analyzed. More specifically, by applying image processing/computer vision techniques such as segmentation, binary and grayscale morphological analysis, and connected-component analysis on the voxels associated with intensity values, objects can be detected as "Blobs" in this volume. Blobs are regions of voxels with similar properties. In one embodiment, when performing morphological operations, a structuring element (or a kernel) in a shape such as a sphere or a cube may be used on a segmented volume to ensure the connectedness of each voxel to adjacent voxels if the criteria for the structural element is met by a given voxel. Next, a connected-component analysis may performed on voxels to test for connectedness. The connected-component analysis labels those connected voxels to identify objects, wherein a group of voxels connected to one another get the same label to mark the same object. During the connected-component analysis, when a voxel is found to be not connected to an existing object but satisfy the criteria for the connectivity type of that object, then this voxel gets the same label associated with the object.

Identified objects may be relabeled to sort the objects for the convenient of analysis. For example, one way of relabeling is to sort data by the sizes of the objects, and then relabel these objects with the largest size objected labeled "1," the next largest size object as "2," etc. Note that the particular structure and size of the structuring element used during morphological analysis may depend on particular situations. These particular situations can include particular actions such as isolating and labeling objects, or removing specific noise. The particular situations can also include different voxel sizes. As an example, a sphere of radius size 1 may be used on minimum size of target objects to be detected and the actual size of the structure element may be determined by the size of the voxels. Specific sizes and configurations of structure element the may be used to target specific situations. Sometimes the sizes and configurations have to be adjusted for resolution in the system.

While using full connectedness during connected-component analysis can typically yield more accurate result, in some situations partial connectedness can also yield reasonable results. Some of the objects may or may not be removed from the object list based on predetermined criteria in order to help classification. Once the set of objects are detected from the volume, these detected objects can then be characterized based on their statistical and geometric properties. For each object, a set of features can be extracted for analysis and classification.

Because the detection or imaging techniques performed by the disclosed charged particles detection systems may be entirely passive, e.g., relying on natural, ambient cosmic rays and on natural emission of gamma rays or induced emission of neutrons from materials of the target object, the disclosed detection system may also be referred to as a Multi-Mode Passive Detection System (MMPDS). The drift tubes of the MMPDS can be used to sense cosmic-ray electrons. More specifically, the drift tubes of the MMPDS which may be used to sense cosmic-ray muons can be used here to sense cosmic-ray electrons.

An MMPDS can measure both scattering signals and stopping signals of muons and electrons passing through a VOI. In some implementations, to establish a relationship of scattering to stopping of cosmic ray charged particles over a range of low-density materials, a given material within a range of low-density materials may be characterized to obtain a scattering parameter and a stopping parameter. A given material being characterized may be placed inside a container, which creates a measurement environment to mimic an actual environment of cosmic-ray imaging and detection. For example, the container can be a shipping container, a cargo container, a compartment of a vehicle (such as the truck of the vehicle), or a package. In some embodiments, an empty container may be measured separately to establish the background measurement. The same container may be used to enclose the VOI for different materials. The scattering-stopping relationship for a range of low-density materials can be established based on the determined pairs of scattering and stopping parameters.

For a given material being measurement, the MMPDS may be used to determine the scattering and stopping of cosmic ray charged particles (including cosmic-ray electrons and cosmic-ray muons) when the VOI is exposed to the cosmic-ray charged particles. In some embodiments, determining the scattering of cosmic ray charged particles includes using a first set of position sensitive cosmic ray charged particle detectors of the MMPDS located above the VOI to detect events of incident cosmic ray charged particles that penetrate the first set of position sensitive cosmic ray charged particle detectors to enter the VOI, and using a second set of position sensitive cosmic ray charged particle detectors of the MMPDS located below the VOI and opposite to the first set of position sensitive cosmic ray charged particle detectors to detect events of outgoing cosmic ray charged particles exiting the VOI. A signal processing unit of MMPDS can be used to receive signals of the incident cosmic ray charged particles from the first set of position sensitive cosmic ray charged particle detectors and signals of the outgoing cosmic ray charged particles from the second set of position sensitive cosmic ray charged particle detectors. The signal processing unit can determine a scattering parameter of the cosmic ray charged particles based on the received signals of the incoming cosmic ray charged particles and the outgoing cosmic ray charged particles. For example, the received signals of the incident cosmic ray charged particles from the first set of position sensitive cosmic ray charged particle detectors can be used to determine a number of incident cosmic ray charged particles and the received signals of the outgoing cosmic ray charged particles from the second set of position sensitive cosmic ray charged particle detectors can be used to determine a number of scattered cosmic ray charged particles. The difference between the number of incident cosmic ray charged particles and scattered cosmic ray charged particles can be used as a measurement of the stopped cosmic ray charged particles. This difference may be referred to as "the raw stopping number."

A charged particle stopping parameter may be determined for an object associated with a VOI. The determination may take into account effects of the object geometry and placement within the MMPDS. The raw stopping number may be affected by the object placement within the MMPDS. An increased number of scattered (i.e., unstopped) tracks can exit the object without passing through the position sensitive cosmic ray charged particle detectors when the object is located near the edges of the MMPDS. Hence, the raw stopping number as described above may tend to overestimate the stopping in such object placements because fewer scattered tracks may be detected. To mitigate this problem, a stopping parameter of a sample, referred to as "stopping power," may be used to mitigate the effects of the sample geometry and placement location within the MMPDS.

A stopping power may be obtained by adjusting the raw stopping number to adequately account for the undetected scattered tracks. The stopping power of an object may be obtained by dividing the raw measurement of the number of stopped tracks (or the "raw number of stopped tracks") by the number of scattered tracks that may be detected. The raw number of stopped tracks may be computed as the number of incident tracks detected minus the number of scattered tracks detected. Because not all scattered tracks may be detected equally efficiently in all parts of the MMPDS (particularly near the edges of the detector arrays of the MMPDS), dividing the raw number of stopped tracks by the number of scattered tracks normalizes for variations in detection efficiency at different locations of the MMPDS. For example, when an object is placed near the center of the MMPDS, the corresponding raw number of stopped tracks tends to be bigger but it may be adjusted through the stopping power parameter by a bigger number of scattered tracks. On the other hand, when an object is placed near an edge of the MMPDS, the corresponding raw number of stopped tracks may be smaller but it may be adjusted through the stopping power parameter by a smaller number of scattered tracks.

In some implementations, the stopping power of an object may expressed as follows:

$$\text{Stopping Power} = \frac{(\text{raw number of stoppped tracks}/\text{area}/\text{time}) \times <p>}{(\text{number of scattered tracks}/\text{area}/\text{time}) \times \text{sample thickness}};$$

where $<p>$ is the average momentum of the incident cosmic rays, and the raw number of stopped tracks is obtained as the number of incident tracks detected minus the number of scattered tracks detected. The stopping power computation may not only takes into account the above-described object placement effects, it may also be normalized for the sample thickness effects. Sample thickness may be a known value or estimated using other means (such as obtained from a reconstruction image).

Figure 2:
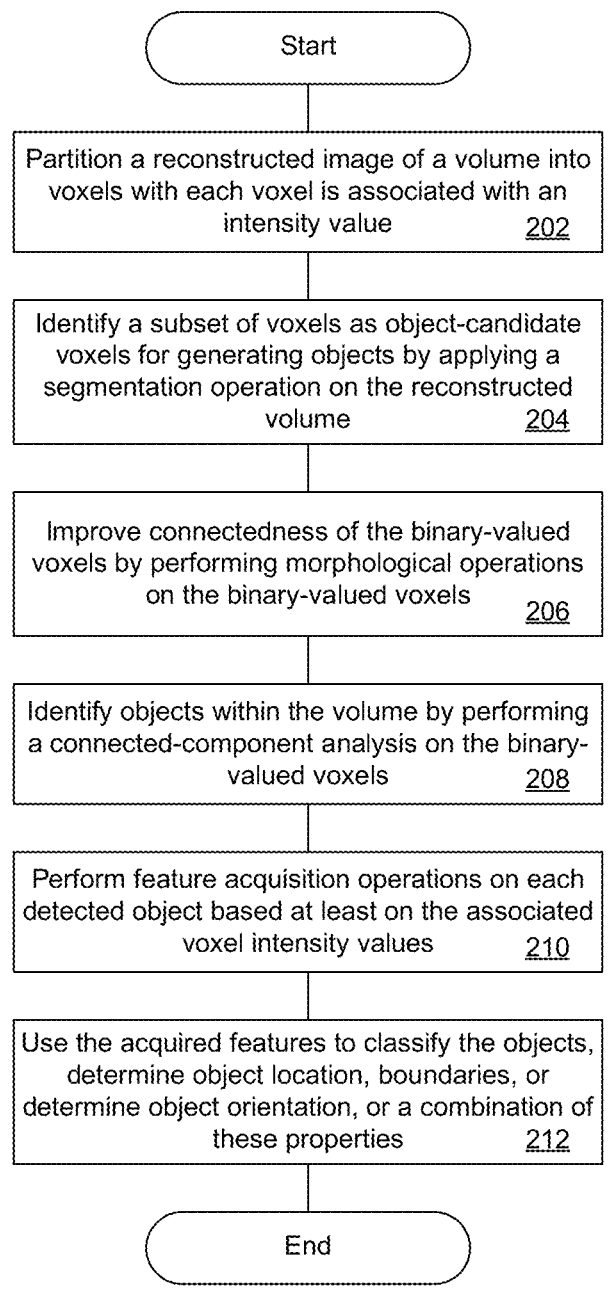
FIG. 2 presents a flowchart illustrating an exemplary process of analyzing a reconstructed volume from cosmic ray based imaging measurements using image processing/computer vision techniques to detect and characterize objects within the reconstructed volume, and to extract features from the detected objects for classification.

FIG. 2 presents a flowchart illustrating an exemplary process of analyzing a reconstructed volume from cosmic ray imaging measurements using image processing/computer vision techniques to detect and characterize objects within the volume, and to obtain features from the detected objects for classification. During operation, the reconstructed volume can be partitioned into voxels with each voxel associated with an intensity value (202). A segmentation operation can be applied on the reconstructed volume to identify qualified voxels as candidate voxels of objects (204). In one embodiment, the segmentation operation can use a high threshold and a low threshold to label each voxel as either an object-candidate voxel or a non-object voxel. A voxel with an intensity value below the low threshold or a value above the high threshold may be labeled with a binary value (1 or 0) to indicate that the voxel is not a candidate of an object (i.e., non-object voxel). A voxel with an intensity value between or within the low threshold and the high threshold range can be labeled with an opposite binary value (0 or 1) to indicate that the voxel is a candidate of an object (i.e., object-candidate voxel).

Responsive to the segmentation operation on the reconstructed volume, one or more binary morphological operations can be applied to the binary-valued voxels to improve connectedness of the binary-valued voxels (206). Applying the one or more binary morphological operation to the binary-valued voxels can be used to "fill holes" inside a cluster of object-candidate voxels that belong to the same object, i.e., reversing the binary values of those non-object voxels (i.e., incorrectly segmented) when the non-object voxels are surrounded by object-candidate voxels. By filling the holes as described, the process of analyzing a reconstructed volume can be used to identify additional object-candidate voxels which has been falsely labeled as non-object voxels to improve connectedness of clusters of the object-candidate voxels and clusters of non-object voxels.

In some embodiments the binary morphological operations can include a morphological erosion operation and a morphological dilation operation (referred to as "morphological open process"). In some embodiments the binary morphological operations can include a morphological dilation operation and a morphological erosion operation (referred to as "morphological close process"). In some embodiments, the binary morphological operations can include other combinations of morphological dilation operation and morphological erosion operation. For example, when performing a morphological close process, a morphological dilation operation can apply a structuring element (or a kernel) in a shape such as a sphere or a cube on the segmented volume. The structuring element can include a group of voxels, and when the structuring element is applied to a given voxel in the segmented volume, all voxels within the space of the structuring element can obtain the binary value of the voxel being operated on. The operation of applying a structuring element to a given voxel can be repeated for all the voxels in the segmented volume. While the morphological dilation operation improves the connectedness of each voxel to adjacent or neighboring voxels by reversing incorrectly-segmented adjacent voxels, the morphological dilation operation can also create an artificial "layer" of object-candidate voxels to each potential object. A morphological erosion operation can be applied on the processed voxels in the segmented volume to remove the artificial "layer" of voxels.

Responsive to improving the connectedness of binary-valued voxels in the segmented volume, the process of analyzing a reconstructed volume can be used to identify unique objects within the segmented volume by applying a connected-component analysis to the binary-valued voxels (208). Each cluster of connected object-candidate voxels can be marked with a common identifier, such as a unique numeral value, to identify a unique object. For example, different clusters of connected object-candidate voxels can be marked sequentially as "1," "2," "3," etc. In some embodiments, when marking a cluster of voxels as the same object, when a voxel is found to be not connected to the object but satisfy the criteria for the connectivity type of that object, the voxel can be marked as being connected to the object. The criteria for connectivity used can include both full and partial connectedness. In some embodiments, full connectedness can indicate that the voxel in question is connected to all the adjacent or neighboring voxels (i.e., horizontally, vertically and diagonally in three dimensional (3D). In an example of a radius of 1 voxel, the full connectedness can consider a total of 27 connected voxels. Partial connectedness refers to other configurations, for example, where the voxel in question is connected to all the other voxels horizontally and vertically but not diagonally, or the voxel can be only connected diagonally but not in the horizontal or vertical directions.

When identifying objects within the segmented volume, a structuring element (or a kernel) in a shape such as a sphere or a cube cam be used to ensure full or partial connectedness of each voxel to adjacent or neighboring voxels. Once the objects are detected from the reconstructed volume, feature acquisition operations can be performed on each detected object based at least on the original voxel intensity values (210). The acquired features can be used to classify the object into categories for material identification purposes (212). The acquired features can be used to determine the location, corners, and boundaries, or orientation of the object, or a combination of these properties (212).

In another variation to the above-described process, a process of analyzing a reconstructed volume can include substantially all the operations described with respect to FIG. 2 except for making optional the morphological dilation operation and morphological erosion operation (206).

In yet another variation to the above-described process, a process of analyzing a reconstructed volume can include substantially all the operations described with respect to FIG. 2 but uses a process of Blob detection to replace the connectedness improvement and object identification operations 206 and 208. Blobs can include regions of voxels with similar properties and Blob detection can refers to mathematical techniques to identify regions of similar voxels which are different from the voxels in the background.

In yet another variation to the above-described process, a process of analyzing a reconstructed volume can include substantially all the operations described with respect to FIG. 2 but the morphological operations is optional (206). In some implementations, in place of the morphological operations, grayscale morphological operations can be performed on the intensity value of image received as a result of the partition operation 202 prior to performing the segmentation operation 204. These grayscale morphological operations can include one of: a grayscale morphological close operation, a grayscale morphological open operation, or a combination-based (combining the grayscale morphological close operation and the grayscale morphological open operation) operation.

In a variation to the above-described process, a process of analyzing a reconstructed volume can include substantially all the operations described with respect to FIG. 2 but can include an additional operation of gradient based convolution on the reconstructed volume prior to the segmentation operation (204).

In some embodiments, each of the above-described processes of analyzing a reconstructed volume can be executed multiple times, each time with different parameters. The results from the multiple executions can be combined to form the object list for analysis, including feature acquisition operations. The extracted features can be used to classify the object into categories for material identification purposes.

In some embodiments, each of the above-described processes of analyzing a reconstructed volume can be executed with adaptive thresholds (during the process of segmentation) that are automatically computed based on volume being analyzed. The acquired features can be used to classify the object into categories for material identification purposes.

In some embodiments, each of the above-described processes of analyzing a reconstructed volume can be executed multiple times with adaptive thresholds during the process of segmentation, each time with different parameters. The results from the multiple executions can be combined to form the object list for analysis, including feature acquisition operations. The acquired features can be used to classify the object into categories for material identification purposes. The acquired features can be used to determine the location, corners, and boundaries, or orientation of the object, or a combination of these properties.

In some embodiments, each of the above-described processes of analyzing a reconstructed volume can be combined with additional techniques, processes or operations to obtain final results. The acquired features can be used to classify the object into categories for material identification purposes. The acquired features can be used to determine the location, corners, boundaries, or orientation of the object, or a combination of these properties.

In some embodiments, each of the above-described processes of analyzing a reconstructed volume can include a pre-processing operation on the input reconstructed volume. The acquired features can then be used to classify the object into categories for material identification purposes. The acquired features can be used to determine the location, corners, boundaries, or orientation of the object.

In some embodiments, each of the above-described processes of analyzing a reconstructed volume can include a pre-processing operation on the input reconstructed volume. The pre-processing operation can include a gradient smoothing or other enhancement operations. The acquired features can be used to classify the object into categories for material identification purposes. The acquired features can be used to determine the location, corners, and boundaries or orientation of the object, or a combination of these properties.

In some embodiments, each of the above-described processes of analyzing a reconstructed volume can include a clustering operation to partition an object based on specific properties into a set of smaller objects. The acquired features can be used to classify the object into categories for material identification purposes. The acquired features can be used to determine the location, corners, and boundaries or orientation of the object, or a combination of these features.

Recall that during the object detection process, the voxels that include the reconstructed object volume are analyzed, and those voxels with intensity values that fall between the low and high threshold values are identified as belonging to the object and form a binary image. In some embodiments, multiple sets of thresholds can be used to increase the set of voxels that can form the object. The selected set of voxels can be conditioned using morphological operators such as dilation and erosion. The resulting voxels can be checked for connectedness and those voxels that fit the connectedness criteria are labeled to generate the objects. The final set of labeled objects can be analyzed for features.

During the volume reconstruction process, the voxel properties such as voxel size can be configurable depending on the type of objects being analyzed. Resolution of the reconstruction can be enhanced by using smaller voxel sizes, but at the expense of longer computation time. In practice, trade-offs can be analyzed and made in selecting voxel sizes. In some implementations, small voxel sizes of one centimeter per voxel has been used for the volume reconstruction as well as feature acquisition as an example. Larger voxel sizes can also work in a similar manner. However, an optimal voxel size can be determined for a given object based on a set of criteria.

The inherent properties of the materials that make up the objects that are inside a container or a package or an inspection object can be determined by determining the relationship of the scattering of cosmic-ray particles by the objects as compared against the stopping of cosmic-ray particles by the object scanned by the detection system (e.g., MMPDS). Once this scattering-stopping relationship has been measured for the range of low-density materials, the measured relationship can be used to detect and identify the contents within a VOI exposed to charged particles.

Figure 3:
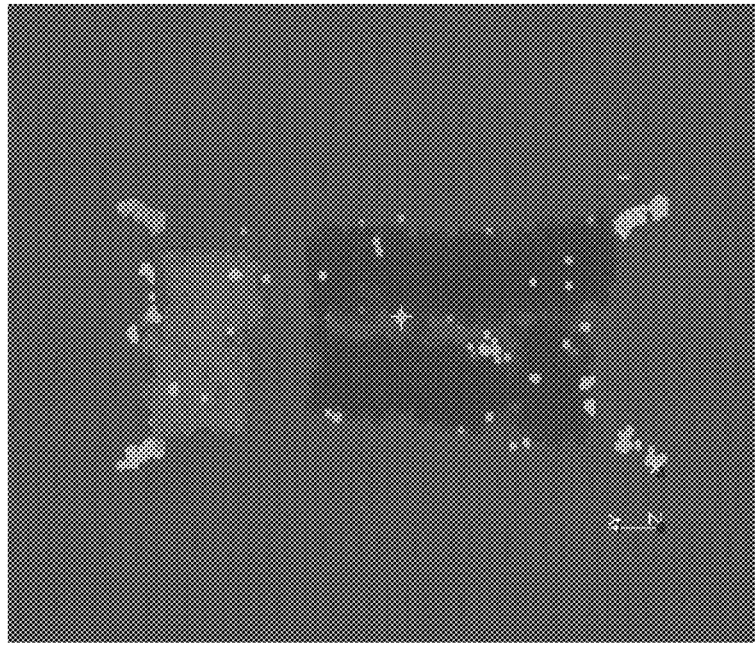
FIG. 3 illustrates an example of analyzing reconstructed volumes of a block of depleted uranium positioned at a predetermined distance above a floor level.
Figure 3:
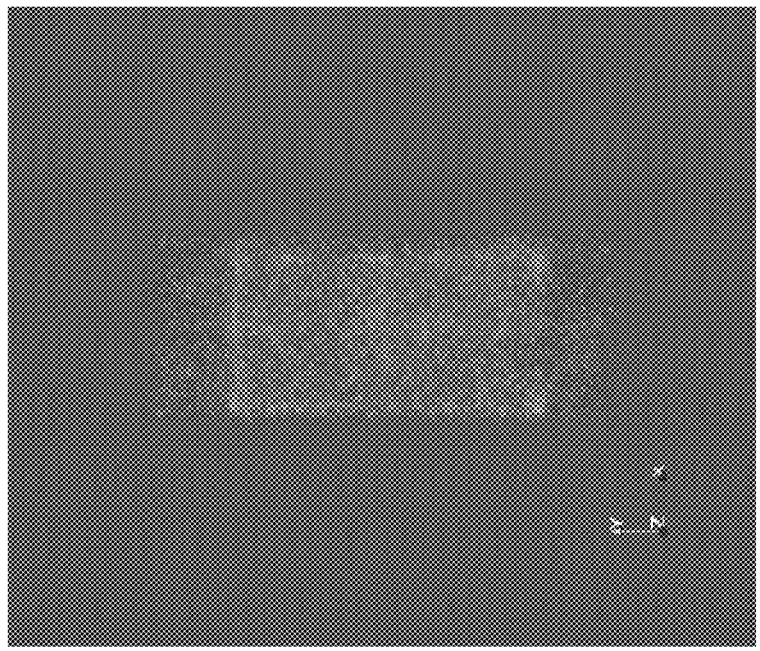
Figure 4:
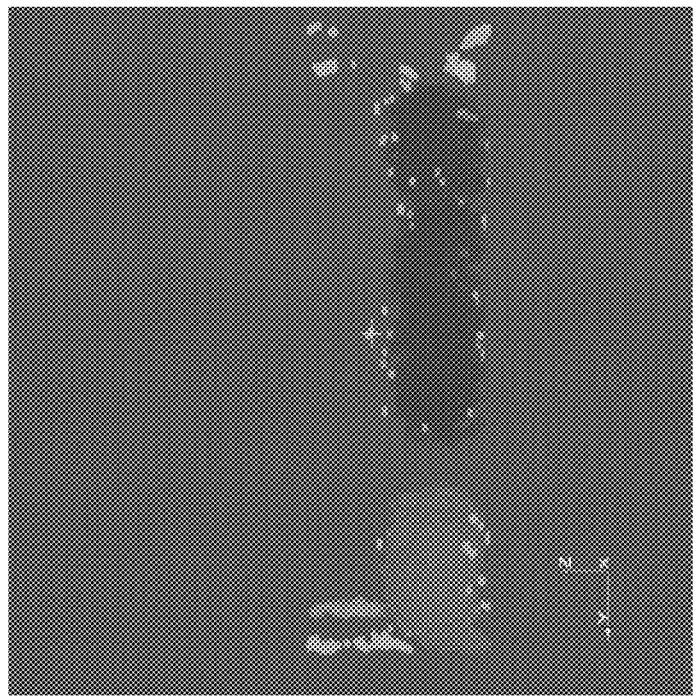
FIG. 4 illustrates an example of analyzing reconstructed volumes of a block of depleted uranium placed on a paper pallet.
Figure 4:
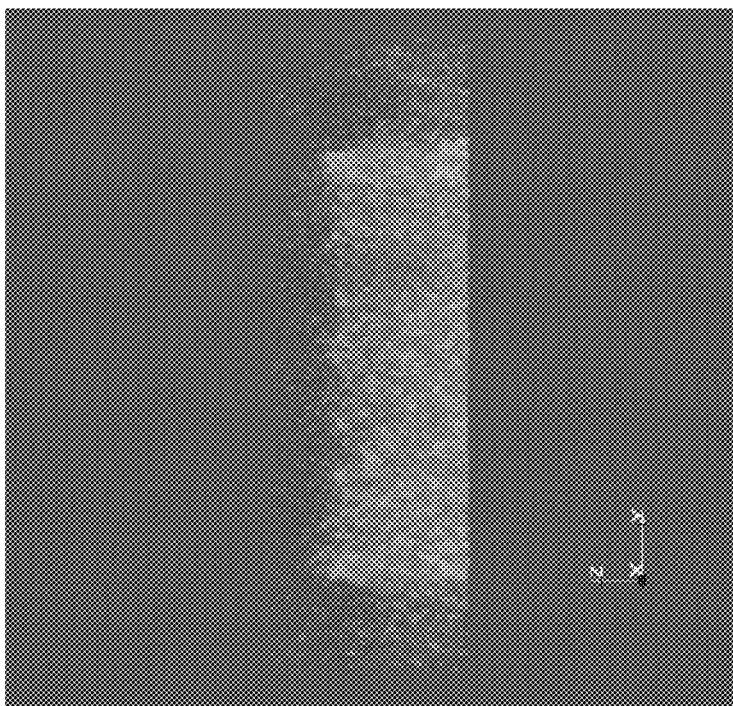
Figure 5:
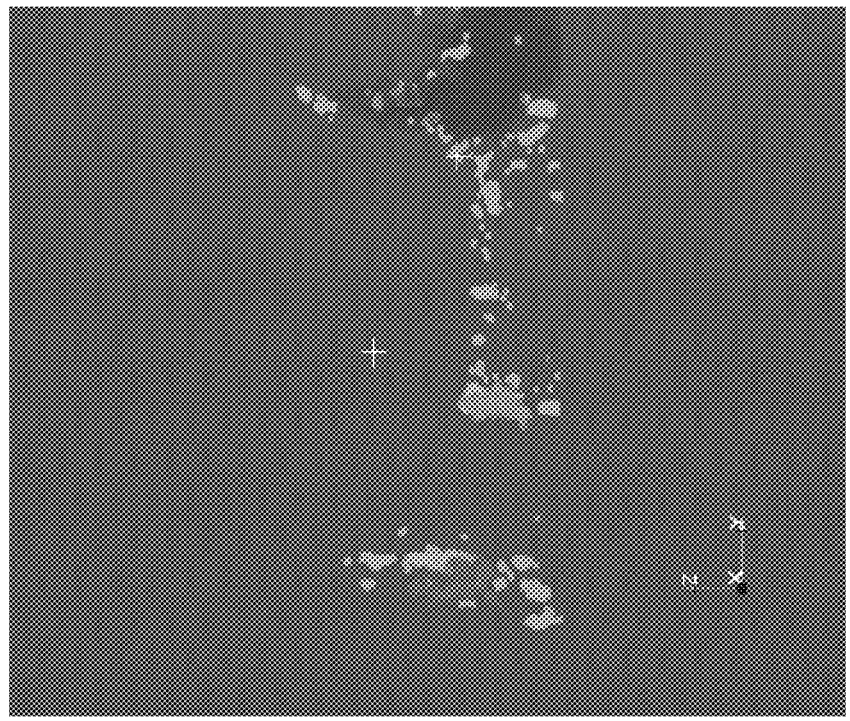
FIG. 5 illustrates an example of analyzing reconstructed volumes of a first block of depleted uranium positioned at a center of the reconstructed volume and a second block of depleted uranium of different size positioned at a corner of the reconstructed volume.
Figure 5:
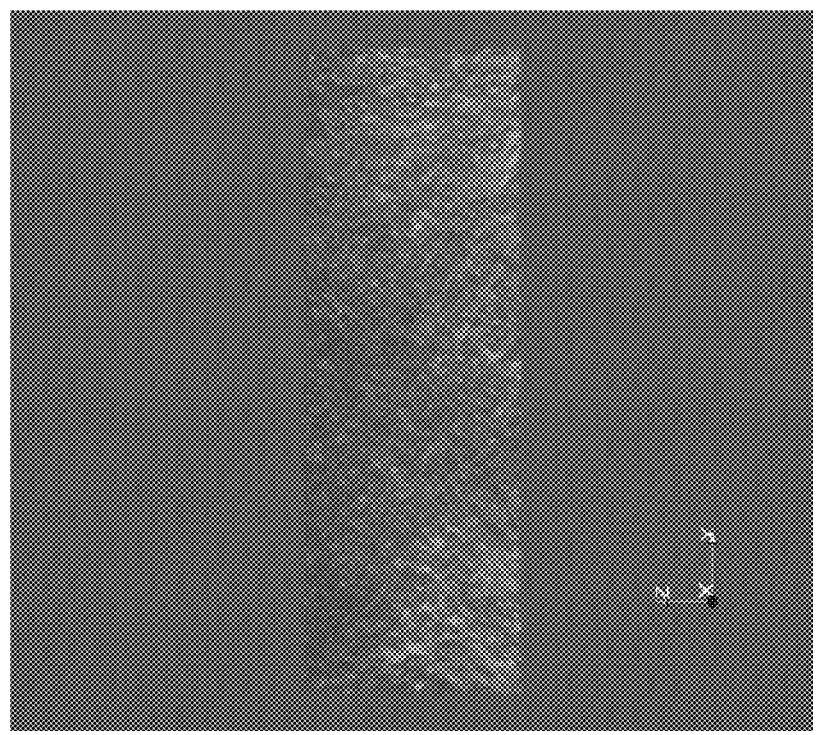

FIGS. 3-5 illustrate various examples of analyzing reconstructed volumes to detect and characterize objects within the reconstructed volumes using the above-described processes involving image processing/computer vision techniques.

FIG. 3 illustrates an example of analyzing reconstructed volumes of a block of depleted uranium positioned some distance above the floor. The image on the left shows the acquired muon image while the image on the right shows the processed image with detected objects.

FIG. 4 illustrates an example of analyzing reconstructed volumes of a block of depleted uranium placed on paper pallet. The image on the left shows the acquired muon image while the image on the right shows the processed image with detected objects.

FIG. 5 illustrates an example of analyzing reconstructed volumes of a first block of depleted uranium positioned at center and a second block of depleted uranium of different size positioned at corner. The image on the left shows the acquired muon image while the image on the right shows the processed image with detected objects.

Once the volume reconstruction is complete, the reconstructed volume can be converted into a 3D image volume with each voxel assigned an intensity value. In some embodiments, the voxel intensity values can be analyzed in conjunction with muon tracks related information, such as point of closest approach (PoCA) values, the flux values, and Sum Log PTheta values generated from the muon detector measurements.

A PoCA value can be a measure of the intersection of the incoming and outgoing muon trajectories. In a three-dimensional space, the extrapolated incoming and outgoing muon trajectories may not intersect. As a result, the distance between the two trajectories when they are closest to one another can be calculated. This calculated distance can be referred to as "the distance of closest approach" (DoCA). The midpoint of the DoCA may be often referred to as the PoCA mentioned above.

The Sum Log PTheta value may be calculated as $\Sigma_{i=1}^{N} \ln(p \times \theta)_i$, wherein $\theta$ is the scattering angle and $p$ is the momentum of the ith muon respectively.

Figure 6:
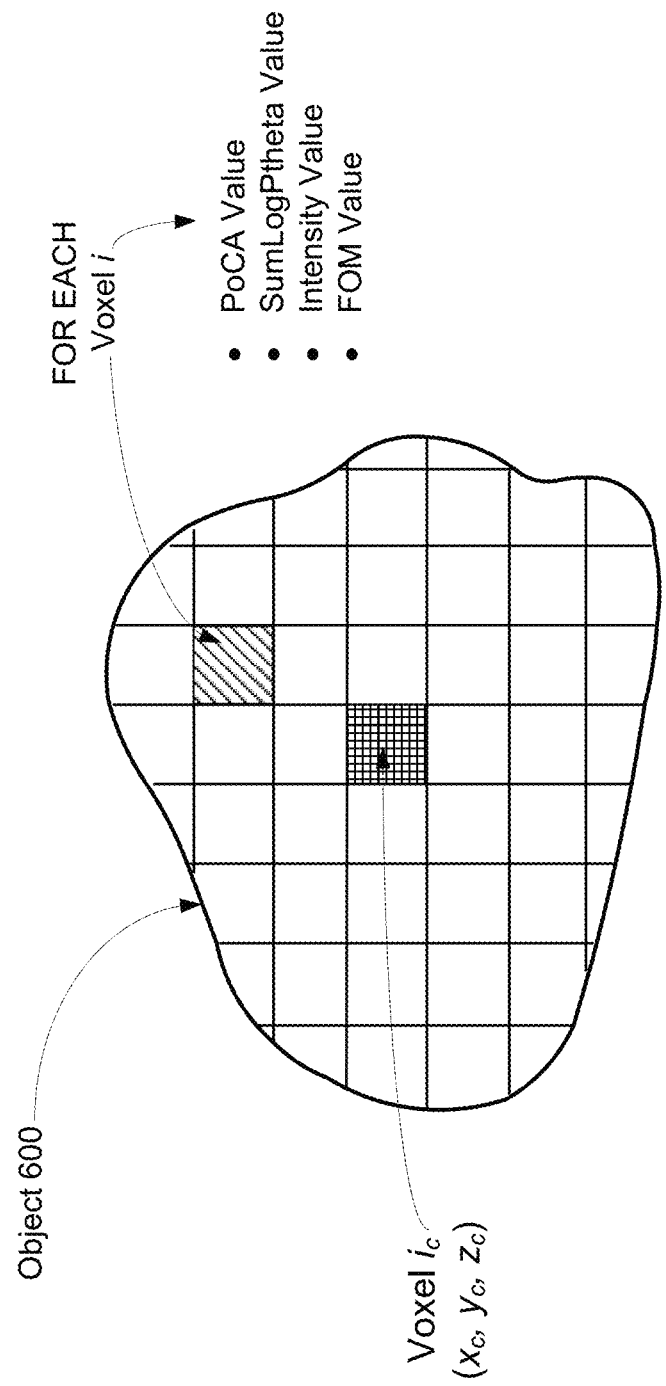
FIG. 6 illustrates an example of a detected object from a reconstructed volume.

FIG. 6 illustrates an example of a detected object 600 from a reconstructed volume. As can be seen in FIG. 6, object 600 is partitioned into voxels in the shape of a cube (note that other shapes can also be used instead of a cube), each voxel i is associated with a set of properties, which includes but are not limited to, an intensity value, a PoCA value, a Sum Log PTheta value and a figure of merit (FOM) value (described below). A special voxel $i_c$ is located at the center of mass of object 600 with variables ($x_c$, $y_c$, $z_c$) representing the coordinates of the center of mass associated with voxel $i_c$. As described below, ($x_c$, $y_c$, $z_c$) can be used to compute a number of voxel features for each voxel i.

The reconstructed volume can be segmented into a binary volume image, checked for morphological properties as well as connectivity between the selected voxels. Isolated groups of connected voxels form objects and these objects can derive properties from the original intensity image and other spatial configuration of each of the connected voxels.

From the reconstructed volume, each labeled object can be acquired and the following features can be characterized per object. Note that some of the object features described below are computed based on the spatial connections of the voxels in the object, voxel intensity values and a set of muon tracks related parameters.

1. Object Volume:

For each group of connected voxels that form the object, the total number of voxels are counted and is scaled by the volume of each voxel. The total volume of the object can be obtained as the volume occupied by all the voxels that include the object, including those voxels added by the morphological operations. Hence, the object volume can be computed as:

Volume=Count of all the object voxels×Volume of each voxel.

2. Average Intensity:

The average intensity of the object is the average intensity of all the connected voxels including those voxels added by morphological operations. The average intensity can be computed as:

AverageIntensity=$\Sigma_{i=1}^{N} I_i/N$, where N is the count of voxels in the object.

3. Variance of the Intensity:

The variance of the intensity of the object is a statistical metric of how much the voxel intensities vary within the object. This value computes the variance of all the intensity values of all the voxels that include the object:

Variance=$\Sigma_{i=1}^{N}(I_i-\text{AverageIntensity})^2/N$, where, N is the count of voxels in the object.

4. Figure of Merit PoCAFOM:

A figure of merit value based on the PoCA values may be computed as:

PoCAFOM=$\Sigma_{i=1}^{N}$Sum Log $P\text{Theta}_i/\Sigma_{i=1}^{N}\text{PoCA\_Values}_i$ 5. Delta of the Intensity:

For all the connected voxels that form a part of each object, a histogram of the voxel intensities for the object is constructed and analyzed. The distance of the maximum intensity value (MaxIntensity) to the mean intensity value (AverageIntensity) is determined as below:

Delta=(MaxIntensity−AverageIntensity).

6. Maximum Value of all the PoCA Values Attributed to the Selected Object Voxels (MaxPoCA).

The Max PoCA metric can be computed by comparing the PoCA numbers attributed to each voxel with other voxels that are part of the same object.

MaxPoCA=MAX(PoCA_Values), where, i=1, 2, . . . , N.

7. Average PoCA:

An average PoCA value (AveragePoCA) of the object is the average of all of the PoCA values attributed to the object and can be computed as the sum of all the PoCA values attributed to the individual voxels in each object divided by the total number of voxels in the object:

AveragePoCA=$\Sigma_{i=1}^{N}\text{PoCA\_Values}_i/N$.

8. Total PoCA:

The total PoCA value (TotalPoCA) attributed to the object is computed as the sum of all the PoCA values attributed to the individual voxels in each object.

$$TotalPoCA = \Sigma_{i=1}^{N} PoCA\_Values_i.$$

9. Shape Ratio:

All the voxels that are connected to each other in a binary volume image are used to compute the largest end-to-end object length, referred to as "the major axis" and the shortest end-to-end object length, referred to as "the minor axis." A shape ratio is computed as the ratio of the two computed objected lengths.

$$ShapeRatio = Major\ Axis/Minor\ Axis.$$

A distance formula can be used to compute distance between two end voxels (x1, y1, z1) and (x2, y2, z2):

$$Distance = \sqrt{((x1-x2)^2 + (y1-y2)^2 + (z1-z2)^2)}.$$

10. Orientation of the Object:

The orientation of the object can be computed by first determining the major axis of the object as defined in #9 and computing the angle that the major axis makes with respect to the horizontal direction.

Figure 7:
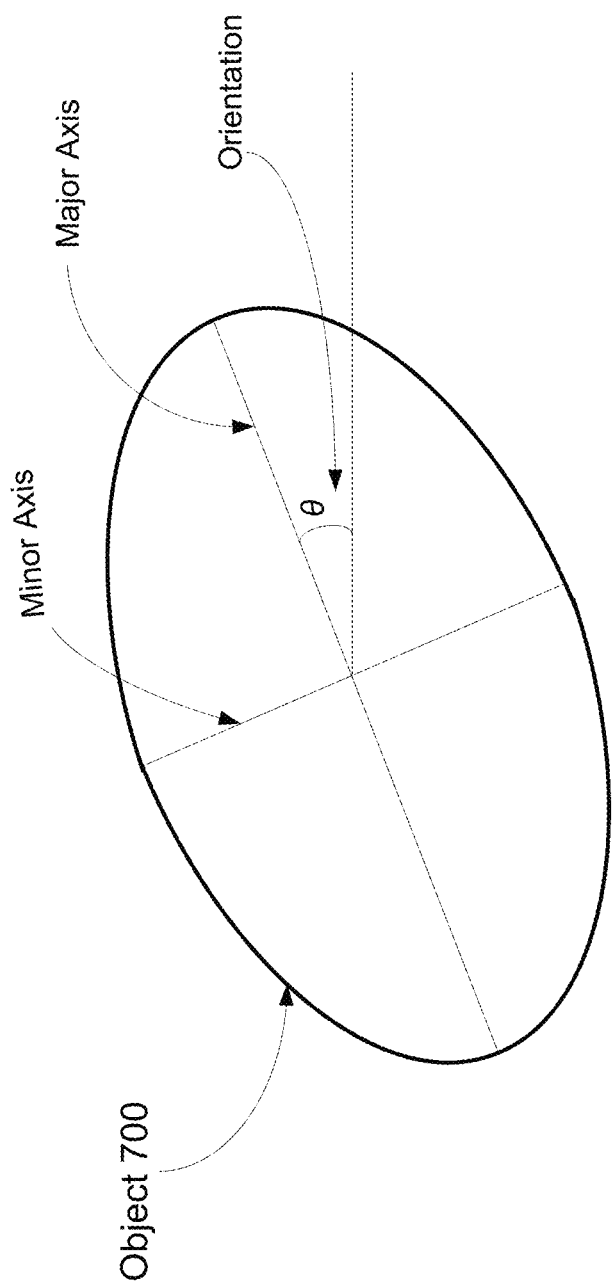
FIG. 7 illustrates an example of a detected object from a reconstructed volume showing major axis, minor axis, and an orientation of the detected object.

FIG. 7 illustrates an example of a detected object 700 from a reconstructed volume showing the aforementioned major axis, minor axis, and the orientation of the object.

11. IntensityDeltaVariation:

The IntensityDeltaVariation metric is obtained by computing the max intensity (MaxIntensity), the average intensity (AverageIntensity) and the standard deviation of the intensities of all the voxels of the object and computing the metric value by using the equation below:

$$IntensityDeltaVariation = (MaxIntensity - AverageIntensity)/\sigma_i,$$

where, $\sigma_i$ is the standard deviation of the intensities of the voxels in the object.

12. PoCADeltaVariation:

A PoCADeltaVariation metric is obtained by computing the max PoCA (MaxPoCA), the average PoCA (AveragePoCA) and the standard deviation of the PoCA values of all the voxels of the object and computing the metric value by using the equation below:

$$PoCADeltaVariation = (MaxPoca - AveragePoCA)/\sigma_p,$$

where $\sigma_p$ is the standard deviation of the PoCA values of the voxels in the object.

13. Sum Log PThetaDeltaVariation:

The Sum Log PThetaDeltaVariation is obtained by computing the maximum of Sum Log PTheta (MaxSum Log PTheta), the average Sum Log PTheta (AvgSum Log PTheta) and the standard deviation of the Sum Log PTheta values of all the voxels of the object and computing the variation value by using the equation below:

$$Sum\ Log\ PThetaDeltaVariation = (MaxSum\ Log\ PTheta - AvgSum\ Log\ PTheta)/\sigma_s,$$

where $\sigma_s$ is the standard deviation of the Sum Log PTheta values of the voxels in the object.

Figure 8:
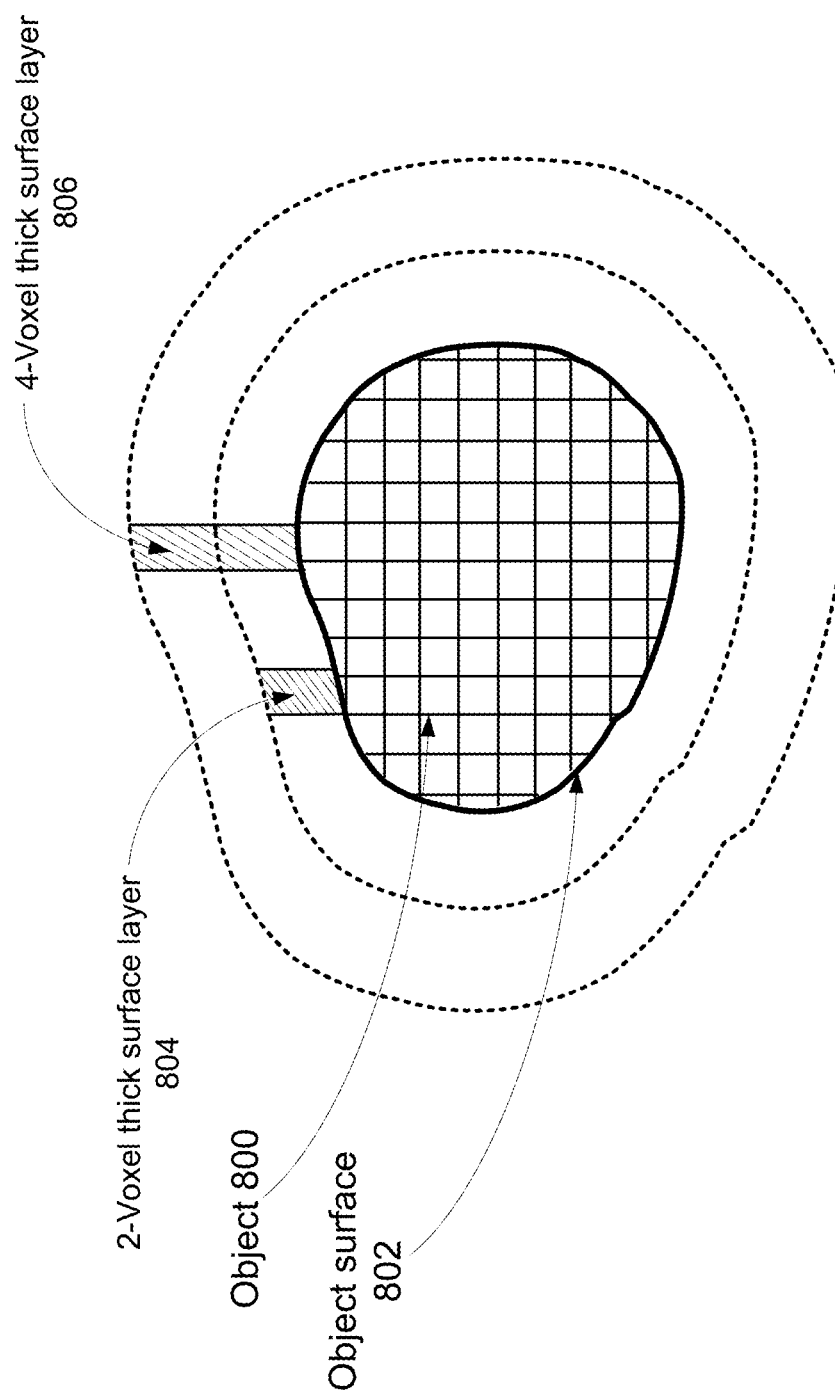
FIG. 8 illustrates an example of a detected object from a reconstructed volume showing surface voxel layers.

FIG. 8 illustrates an example of a detected object 800 from a reconstructed volume showing surface voxel layers. As can be seen in FIG. 8, object 800 is partitioned into equal size voxels. To grow object 800 a 2-voxel thick surface layer 804 can be added just outside the object surface 802 and adjacent to the surface voxels of object 800. Similarly, a 4-voxel thick surface layer 806 can be added just outside the object surface 802 and adjacent to the surface voxels of object 800. These additional layer of voxels are used to acquire object features 14 and 15 below.

14. BoundaryLayerAvg2:

A BoundaryLayerAvg2 metric computes the average intensity value of a 2-voxel thick layer just above the object surface and adjacent to the object surface voxels. The BoundaryLayerAvg2 metric can be computed as:

$$BoundaryLayerAvg2 = \Sigma_{i=1}^{M} I_i/M,$$

where M is the total number of voxels in the 2-voxel thick layer, and $I_i$ is the intensity of each voxel in the 2-voxel thick layer.

15. BoundaryLayerAvg4:

A BoundaryLayerAvg4 metric computes the average intensity value of a 4-voxel thick layer just above the object surface and adjacent to the object surface voxels. The BoundaryLayerAvg4 metric can be computed as:

$$BoundaryLayerAvg4 = \Sigma_{i=1}^{M} I_i/M,$$

where M is the total number of voxels in the 4-voxel thick layer, and $I_i$ is the intensity of each voxel in the 4-voxel thick layer.

16. ObjectGradient:

An ObjectGradient metric is computed by computing the derivative gradients in the x, y and z directions and computing the magnitude of the gradients in all the voxels of the object. The magnitudes are summed and divided by the total number of voxels in the object. The ObjectGradient metric may be computed as:

$$ObjectGradient = \Sigma_{i=1}^{N} \sqrt{(xgrad_i)^2 + (ygrad_i)^2 + (zgrad_i)^2}/N,$$

where N is the count of all the voxels in the object, and xgrad, ygrad, zgrad are sum of gradients in x, y, z directions in all the voxels in the object.

17. ObjectGradient2:

An ObjectGradient2 metric is computed by computing the derivative gradients of the voxels in the 2-layer boundary adjacent to the surface of the object (i.e., the first two layers of voxels from the object surface) in the x, y and z directions and computing the magnitude of the gradients in all the 2-layer boundary voxels of the object. The magnitudes are summed and divided by the total number of voxels in the 2-adjacent layers in the object. The ObjectGradient2 metric may be computed as:

$$ObjectGradient2 = \Sigma_{i=1}^{N} \sqrt{(xgrad_i)^2 + (ygrad_i)^2 + (zgrad_i)^2}/N,$$

where N is the count of all the voxels in the 2-layer boundary of the object, and xgrad, ygrad, zgrad are sum of gradients in x, y, z directions in the 2-layer boundary of the object.

18. ObjectGradient4:

An ObjectGradient4 metric is computed by computing the derivative gradients of the voxels in the 4-layer boundary adjacent to the surface of the object (i.e., the first four layers of voxels from the object surface) in the x, y and z directions and computing the magnitude of the gradients in all the 4-layer boundary voxels of the object. The magnitudes are summed and divided by the total number of voxels in the 4-adjacent layers in the object. The ObjectGradient4 metric may be computed as:

$$ObjectGradient4 = \Sigma_{i=1}^{N} \sqrt{(xgrad_i)^2 + (ygrad_i)^2 + (zgrad_i)^2}/N,$$

where N is the count of all the voxels in the 4-layer boundary of the object, and xgrad, ygrad, zgrad are sum of gradients in x, y, z directions in the 4-layer boundary around the object.

19. Compactness:

The compactness metric is computed as the ratio of the surface voxels (which is a count of all the voxels that form the surface of the object) and the total voxels (which is the count of all the voxels in the object). The compactness metric can be computed as:

Compactness=Surface Voxels/Total Voxels.

20. Energy:

The Energy metric is the sum of the product of the difference between the intensity value of each voxel and the intensity value of the voxel at the center of mass and its distance from the center of mass of the object. The Energy metric can be computed as:

Energy=$\Sigma_{i=1}^{N}((I_i-I_c)^2 * \sqrt{(x_c-x_i)^2+(y_c-y_i)^2+(z_c-z_i)^2})$, where, N is the count of all the voxels in the object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

21. PoCAEnergy:

The PoCAEnergy metric is the sum of the product of the difference between the PoCA value of each voxel and the PoCA value at the center of mass and its distance from the center of mass of the object. The PoCAEnergy metric can be computed as:

PoCAEnergy=$\Sigma_{i=1}^{N}((PoCA\_Value_i - PoCA\_Value_c)^2 * \sqrt{(x_c-x_i)^2+(y_c-y_i)^2+(z_c-z_i)^2})$, where, N is the count of all the voxels in the object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

22. SumPThetaEnergy:

The SumPThetaEnergy metric is the sum of the product of the difference between the sum of ptheta value of each voxel and the voxel at the center of mass and its distance from the center of mass of the object. The SumPThetaEnergy metric can be computed as:

$$SumPThetaEnergy = \sum_{i=1}^{N}\left((SumPTheta_i - SumPTheta_c)^2 * \sqrt{(x_c - x_i)^2 + (y_c - y_i)^2 + (z_c - z_i)^2}\right),$$

where, N is the count of all the voxels in the object, i is the index of voxel in the object, $x_i$, $y_i$, $z_i$ are coordinates of the ith voxel, $x_c$ is the x-coordinate of the center of mass, $y_c$ is the y-coordinate of the center of mass, and $z_c$ is the z-coordinate of the center of mass.

23. Entropy:

The entropy metric is a measure of uncertainty in the object. To obtain the entropy value, the probability density function P is computed from the histogram H of the intensity values of voxels in the object. The entropy metric can be computed as:

Entropy=$-\Sigma_{i=1}^{N}(P_i * \log_2 P_i)$,

Where, probability $P_i = H_i / \Sigma_{k=1}^{N} H_k$, i and k are indices of the histogram H.

24. SpikeEnergy:

The SpikeEnergy metric is the sum of the squares of the difference between the intensity value of a given voxel and the mean intensity value of all voxels in the identified object, but responsive to the intensity value of the given voxel exceeding the mean intensity value for the identified object. The SpikeEnergy metric can be computed as:

SpikeEnergy=$\Sigma_{i=1}^{M}(I_i-\mu)^2$, if$(I_i-\mu)>0$, wherein $\mu$ is the mean intensity value for the object.

25. SurfaceIntensity:

Of all the voxels that are connected to each other to form an object, the surface voxels are identified as the voxels that are connected to the object on at least one side and connected to the outside of the object on at least one side. The SurfaceIntensity metric measures the intensities of all the surface voxels:

SurfaceIntensity=$\Sigma_{i=1}^{M}S_i$, where M is the count of all the voxels in the surface of object and S are the voxels that form the surface of the object.

26. IntegFullIntensity:

The IntegFullIntensity metric is obtained by summing or integrating the intensity values of all the voxels that are part of the object. The IntegFullIntensity metric may be computed as:

IntegFullIntensity=$\Sigma_{i=1}^{N}I_i$, where N is the count of all the voxels in the object.

27. InnerintegIntensity:

The InnerintegIntensity metric is the sum of the intensities of the voxels that form the object but excluding the intensities of the voxels on the surface of the object. The InnerintegIntensity metric may be computed as:

InnerintegIntensity=$\Sigma_{i=1}^{N}I_i - \Sigma_{j=1}^{M}S_j$, where N is the count of all the voxels in the object, M is the count of the voxels on the surface of the object, I is intensity of each voxel of the object, and S is the intensity of each surface voxel of the object.

28. IntegIntensityRatio:

The IntegIntensityRatio metric is the ratio of the average surface intensity value computed as the sum of all the intensities of the surface voxels divided by the total surface voxels and the average of all the intensities of all the voxels in the object. The IntegIntensityRatio metric can be computed as:

IntegIntensityRatio=SurfaceIntensity/(Number of surface voxels×AverageIntensity).

29. Moments:

To compute the moments metric, the center of mass is computed for each of the voxels connected to each other and identified as $x_c$, $y_c$, $z_c$ coordinates. The moments for the object are computed by the sum of squares of the translations of each voxel from the center of mass times the intensity of that voxel.

Moments=$\Sigma_{i=1}^{N}(I_i * \sqrt{(x_c-x_i)^2(y_c-y_i)^2+(z_c-z_i)^2})$, where $I_i$ is the intensity value of the voxel ($x_i$, $y_i$, $z_i$), $x_c$ is the x-coordinate of the center of mass, $y_c$ is the y-coordinate of the center of mass, and $z_c$ is the z-coordinate of the center of mass.

FIGS. 9-18 illustrate various examples of analyzing reconstructed volumes to detect and characterize containers, packages, or inspection objects within the volumes using the above-described processes involving image processing/computer vision techniques.

Figure 9:
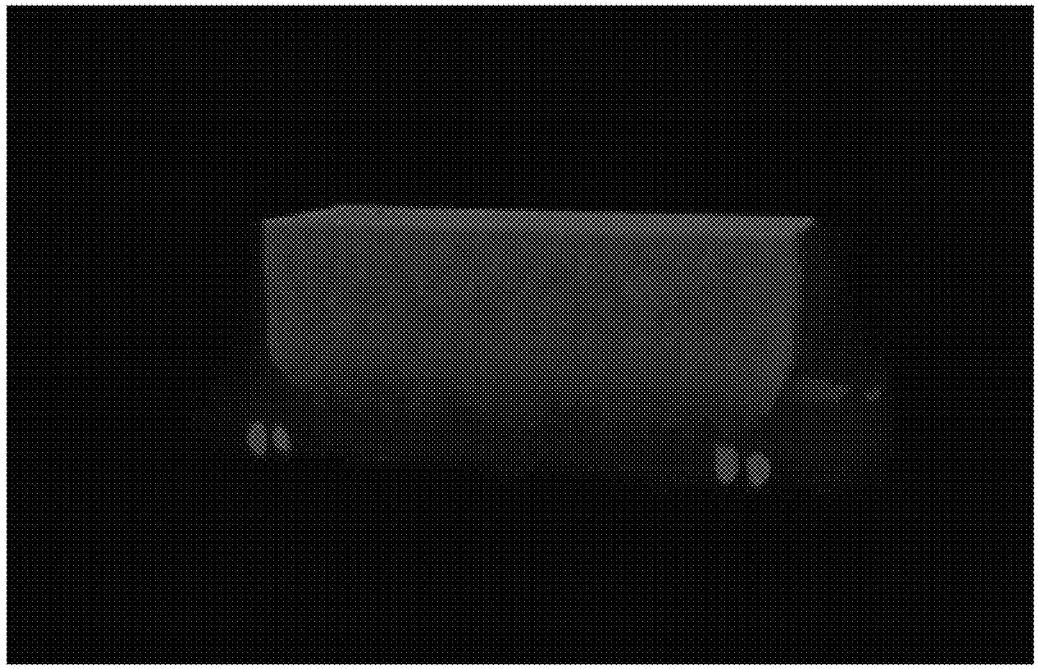
FIG. 9 illustrates an example of a segmented volume with hitch and fiducials.

In some embodiments, the reconstructed (cargo or inspection) volume, including a container or a package or inspection object, may be analyzed using image processing techniques/algorithms (described above, for example, with respect to FIG. 2) to detect the extents of the container or package or inspection object. For example, the image based algorithms can include a process of segmentation using a high threshold and a low threshold to segment the container or package or inspection object (e.g., similar to what is described with relation to operation 204 of FIG. 2 above). For example, the segmentation operation can use a high threshold and low threshold to label each voxel as either an object-candidate voxel or a non-object voxel. An object voxel may be, e.g., a voxel associated with the container or package or inspection object, and a non-object voxel may be, e.g., a voxel not associated with the container or package or inspection object. A voxel with an intensity value below the low threshold or a value above the high threshold is labeled with a binary value (1 or 0) to indicate that the voxel is not a candidate of an object (i.e., non-object voxel). A voxel with an intensity value between the low threshold and the high threshold is labeled with an opposite binary value (0 or 1) to indicate that the voxel is a candidate of an object (i.e., object-candidate voxel). FIG. 9 illustrates an example of a segmented volume with hitch and fiducials. For example, FIG. 9 shows an image of a reconstructed volume that is a side view of a truck container, which includes the hitch and the fiducials of the truck.

Figure 10:
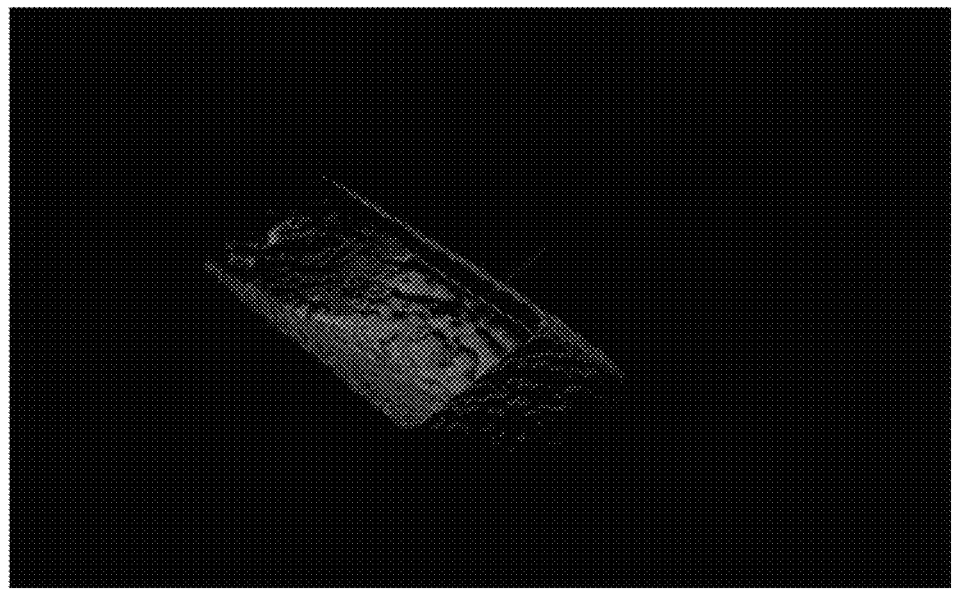
FIG. 10 illustrates an example of a segmented and morphologically manipulated container in a reconstructed volume.
Figure 11:
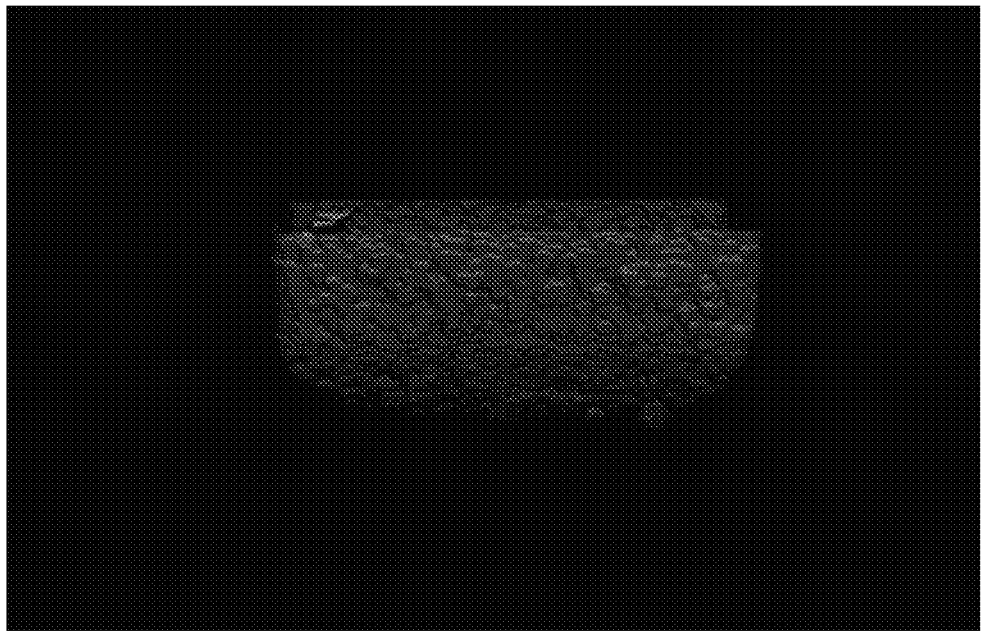
FIG. 11 illustrates a side view of an exemplary segmented and morphologically manipulated container in the reconstructed volume.
Figure 17:
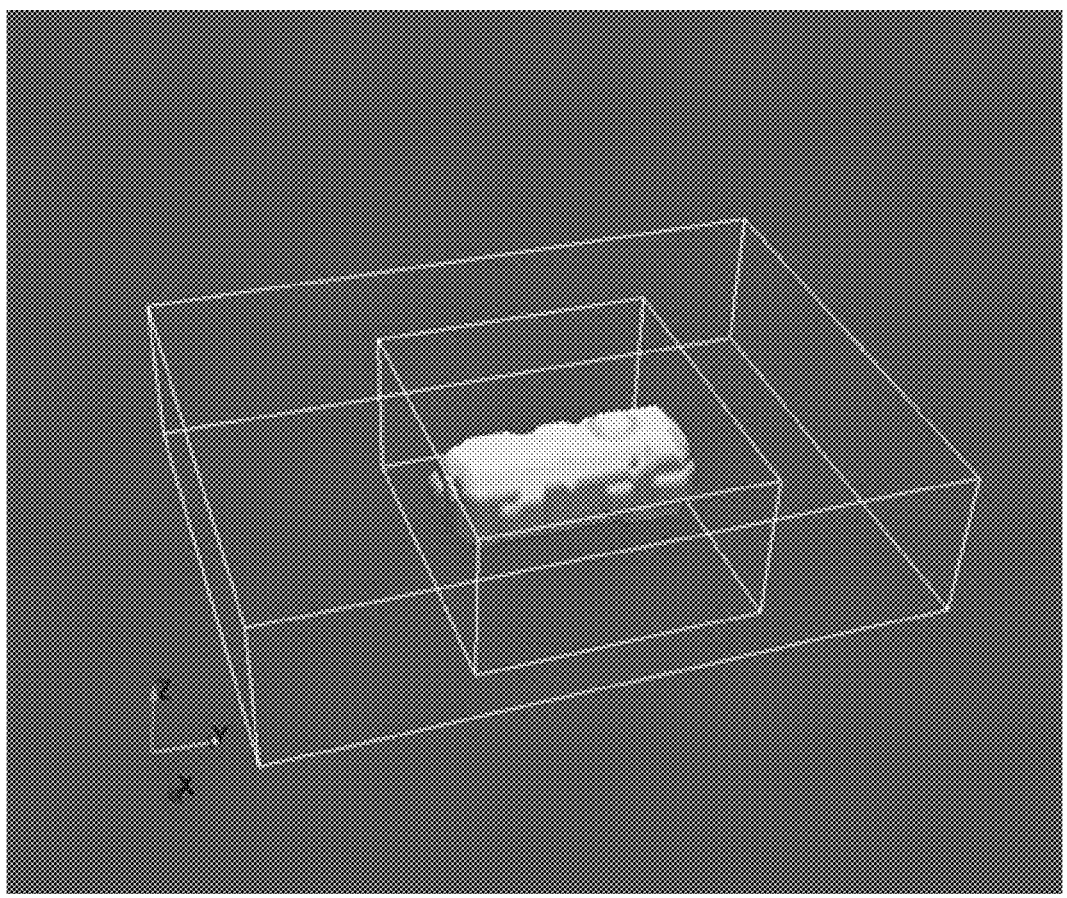
FIG. 17 illustrates an example of a package or object in a reconstructed volume with an outer box that can indicate a full volume detected and a smaller box can indicate a volume under inspection, and bounds for the package or object can be represented by the smallest box enclosing the package or object.

The process of segmentation can be followed by a sequence of morphological dilation and morphological erosion operators (e.g., similar to what is described with relation to operation 206 of FIG. 2 above). FIG. 10 illustrates an example of a segmented and morphologically manipulated container in the reconstructed volume. In particular, FIG. 10 shows an image of a truck container, without the hitch, after the process of segmentation and after a sequence of morphological dilation and morphological erosion operators have been performed on the reconstructed volume of FIG. 9. FIG. 11 illustrates an example of a side view of a segmented and morphologically manipulated container in the reconstructed volume. For example, FIG. 11 shows an image of a side view of a truck container, without the hitch, after the process of segmentation and after a sequence of morphological dilation and morphological erosion operators have been performed on the reconstructed volume of FIG. 9. The sequence of morphological dilation and morphological erosion operators can be followed by a connected-component analysis (e.g., similar to what is described with relation to operation 208 of FIG. 2 above). During the connected-component analysis, each cluster of candidate voxels of the container or package or inspection object can be marked or labeled with a common identifier, such as a unique numeral value, to identify a unique object. As described above, a structuring element (or kernel) in a shape such as a sphere or a cube can be used to ensure full or partial connectedness of each voxel to adjacent voxels for the connected-component analysis. Once these image processing techniques/algorithms have been used, the location and boundaries of the volume pertaining to the container or package or inspection object can be detected to give the corners of the container or package or inspection object and the orientation of the container or package or inspection object. FIG. 17 illustrates an example of a package or inspection object in a reconstructed volume with the outer box able to indicate the full volume detected and the smaller box can indicate the volume under inspection. The bounds for the package or object can be the smallest box enclosing the package or object. Thus, in FIG. 17, the location, corners, and boundary for the package or inspection object can be the smallest box shown.

In some embodiments, the reconstructed (cargo or inspection) volume, including a container or a package or inspection object, can be analyzed using image processing techniques/algorithms (described above, for example, with respect to FIG. 2) to detect the container or package or inspection object. For example, the image based algorithms can include a process of segmentation using a high threshold and a low threshold to segment the container or package or inspection object (e.g., similar to what is described with relation to operation 204 of FIG. 2 above). In particular, the segmentation operation may use a high threshold and low threshold to label each voxel as either an object-candidate voxel or a non-object voxel. An object voxel may be, e.g., a voxel associated with the container or package or inspection object, and a non-object voxel may be, e.g., a voxel not associated with the container or package or inspection object. A voxel with an intensity value below the low threshold or a value above the high threshold is labeled with a binary value (1 or 0) to indicate that the voxel is not a candidate of an object (i.e., non-object voxel). A voxel with an intensity value between the low threshold and the high threshold is labeled with an opposite binary value (0 or 1) to indicate that the voxel is a candidate of an object (i.e., object-candidate voxel). Once this image processing technique/algorithm has been used, the corners of the volume pertaining to the container or package or inspection object can be extracted to give the location, corners, and boundary of the container or package or inspection object and the orientation of the container or package or inspection object.

Figure 18:
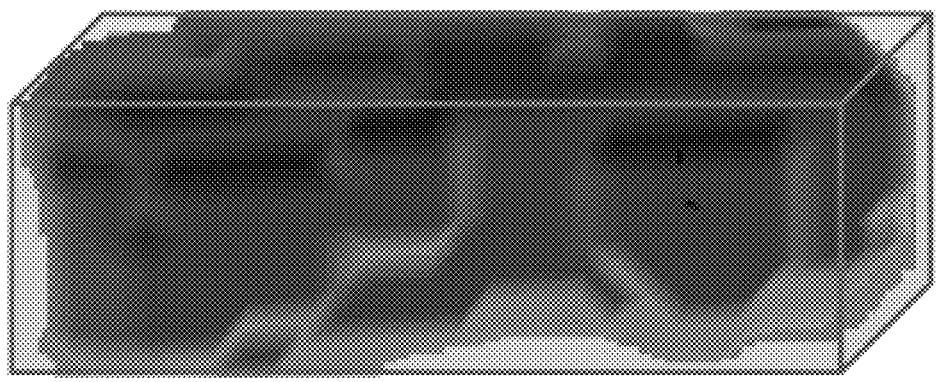
FIG. 18 illustrates an example of an object in a reconstructed volume that is bounded by eight vertices of a box.

In some embodiments, the reconstructed (cargo or inspection) volume, including a container or a package or inspection object, can be analyzed using image processing techniques/algorithms (described above, for example, with respect to FIG. 2) to detect the container or package or inspection object. In particular, the extents of the container or package or inspection object can be located by determining the locations of the edges of the container or package or inspection object using the image processing techniques/algorithms. For example, the image processing techniques/algorithms can include a process of finding the edges of the container, the wheels, and the truck, e.g., in the image of the reconstructed volume. The locations of the corners of the container or package or inspection object can be determined based on the locations of the edges. The location, corners, and boundary of the container or the package or inspection object and the orientation of the container or package or inspection object can be computed based on these locations. FIG. 18 illustrates and example of an inspection object in a reconstructed volume that is bounded by eight vertices of a box. The vertices of the box are determined by the locations of the corner of the inspection object.

In some embodiments, the reconstructed volume, including a container or a package or an inspection object, can be analyzed using image processing techniques/algorithms (described above, for example, with respect to FIG. 2) to detect the extents of the container or package or inspection object. For example, the image based algorithms can include a process of segmentation using a high threshold and a low threshold to segment the container or package or inspection object (e.g., similar to what is described with relation to process 204 of FIG. 2 above). In particular, the segmentation operation may use a high threshold and low threshold to label each voxel as either an object-candidate voxel or a non-object voxel. An object voxel can be, e.g., a voxel associated with the container or package or inspection object, and a non-object voxel can be, e.g., a voxel not associated with the container or package or inspection object. A voxel with an intensity value below the low threshold or a value above the high threshold is labeled with a binary value (1 or 0) to indicate that the voxel is not a candidate of an object (i.e., non-object voxel). A voxel with an intensity value between the low threshold and the high threshold is labeled with an opposite binary value (0 or 1) to indicate that the voxel is a candidate of an object (i.e., object-candidate voxel). Once this image processing technique/algorithm has been used, the locations of the edges of the container or package or inspection object can be determined using the image processing techniques/algorithms. For example, the image processing techniques/algorithms can include a process of finding the edges of the container, the wheels, and the truck, e.g., in the image of the reconstructed volume. The locations of the corners of the container or package or inspection object can be determined based on the locations of the edges. The location, corners, and boundary of the container or the package or inspection object and the orientation of the container or package or inspection object can be computed based on these locations. Moreover, in the example of the truck of FIG. 9, the wheel and truck can sequentially be detected by the expected relative positions of these objects in the view of the image of the reconstructed volume.

Figure 12:
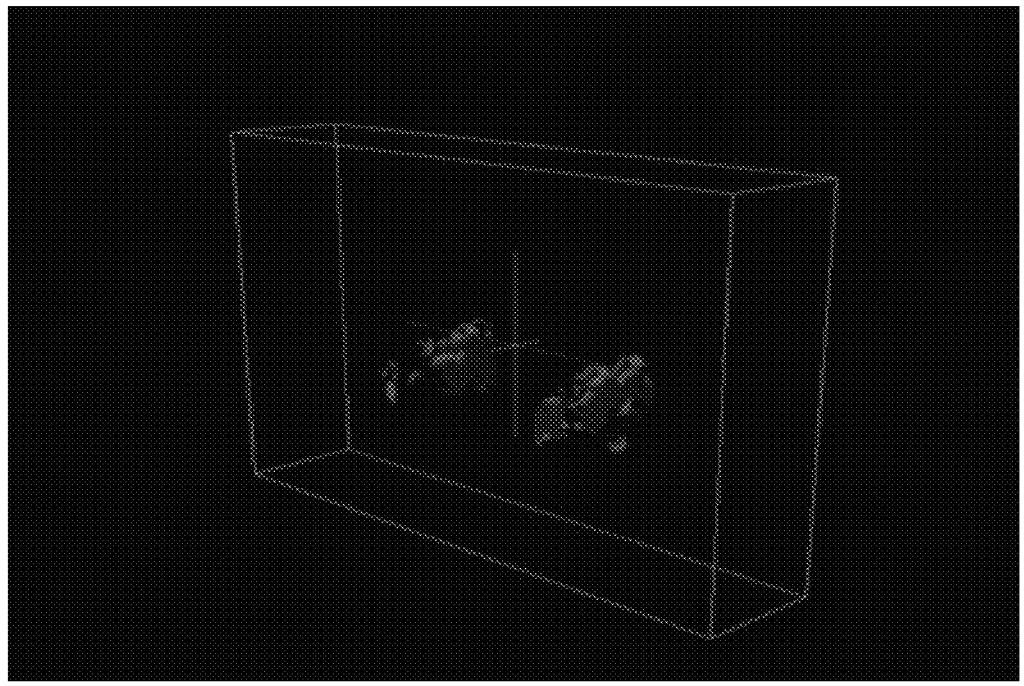
FIG. 12 illustrates an example of an extraction of a hitch to determine a bottom end of a container in a reconstructed volume.

In some embodiments, the reconstructed volume, including a container or a package or an inspection object, can be analyzed using image processing techniques/algorithms (described above, for example, with respect to FIG. 2) to locate features within the container or package, e.g., to determine the lower extents of the inspection area. For example, the image based algorithms can include a process of segmentation using a high threshold and a low threshold to segment features in the container or package (e.g., similar to what is described with relation to step 204 of FIG. 2 above). In particular, the segmentation operation can use a high threshold and low threshold to label each voxel as either an object-candidate voxel or a non-object voxel. An object voxel can be, e.g., a voxel associated with the container or package or inspection object, and a non-object voxel may be, e.g., a voxel not associated with the container or package or inspection object. A voxel with an intensity value below the low threshold or a value above the high threshold is labeled with a binary value (1 or 0) to indicate that the voxel is not a candidate of an object (i.e., non-object voxel). A voxel with an intensity value between the low threshold and the high threshold is labeled with an opposite binary value (0 or 1) to indicate that the voxel is a candidate of an object (i.e., object-candidate voxel). Once this image processing technique/algorithm has been used, the location and boundaries of the volume pertaining to the feature in the container or package may be extracted to give the corner of the feature in the container or package and the orientation of the feature in the container or package. For example, the image processing techniques/algorithms of this paragraph can be used to determine the lower extents of the area under inspection. FIG. 12 illustrates an example of the extraction of the hitch to determine the bottom end of a container in the reconstructed volume in accordance with the techniques/algorithms of this paragraph. FIG. 12 shows the bottom end of the truck container of FIG. 9, where the hitch has been extracted.

Figure 13:
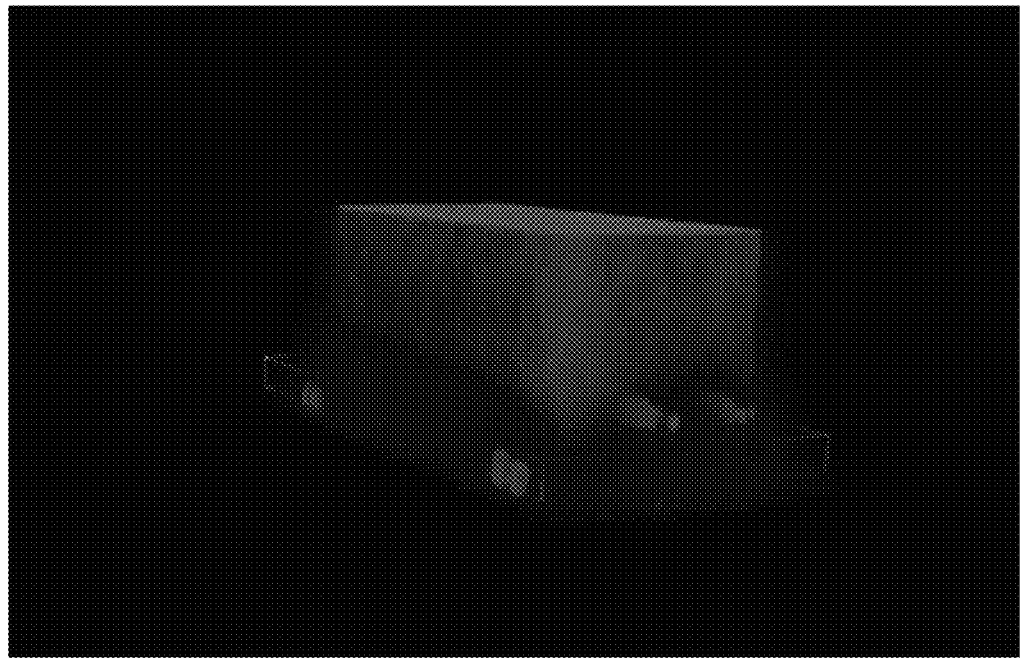
FIG. 13 illustrates an example of an extraction of a lower part of a detector volume, a fixed height from a bottom in order to find fiducials in a reconstructed volume.

In some embodiments, the reconstructed volume, including a container or a package or an inspection object or multiple objects, may be analyzed using image processing techniques/algorithms (described above, for example, with respect to FIG. 2) to extract a volume of fixed height (e.g., along the z-axis) from the detector and extract each fiducial as an object, find its location, and measure the properties of each fiducial. For example, the image based algorithms may include a process of segmentation using a high threshold and a low threshold to segment the reconstructed volume (e.g., similar to what is described with relation to step 204 of FIG. 2 above). In particular, the segmentation operation may use a high threshold and low threshold to label each voxel as either an object-candidate voxel or a non-object voxel. An object voxel may be, e.g., a voxel associated with the container or package or inspection object, and a non-object voxel may be, e.g., a voxel not associated with the container or package or inspection object. A voxel with an intensity value below the low threshold or a value above the high threshold is labeled with a binary value (1 or 0) to indicate that the voxel is not a candidate of an object (i.e., non-object voxel). A voxel with an intensity value between the low threshold and the high threshold is labeled with an opposite binary value (0 or 1) to indicate that the voxel is a candidate of an object (i.e., object-candidate voxel). FIG. 9 illustrates an example of a segmented volume with hitch and fiducials. FIG. 9 shows an image of a reconstructed volume that is a side view of a truck container, which includes the hitch and the fiducials of the truck. The process of segmentation can be followed by a sequence of morphological dilation and morphological erosion operators (e.g., similar to what is described with relation to step 206 of FIG. 2 above). FIG. 13 illustrates an example of the extraction of the lower part of the detector volume, a fixed height from the bottom in order to find the fiducials in the reconstructed volume. Using the segmentation, dilation, and erosion techniques/algorithms, the lower part of the detector volume can be acquired, for example, the lower part of the reconstructed volume that is a fixed predetermined height from the bottom of the reconstructed volume. The fiducials may then be found, as objects, for example, using connected-component analysis. The fiducials can be located, as objects, for example, by determining the center of mass of the container or the package or the inspection object or the fiducials.

Figure 14:
FIG. 14 illustrates an example of automatically locating fiducials in a reconstructed volume, where the fiducials are of a known size.
Figure 15:
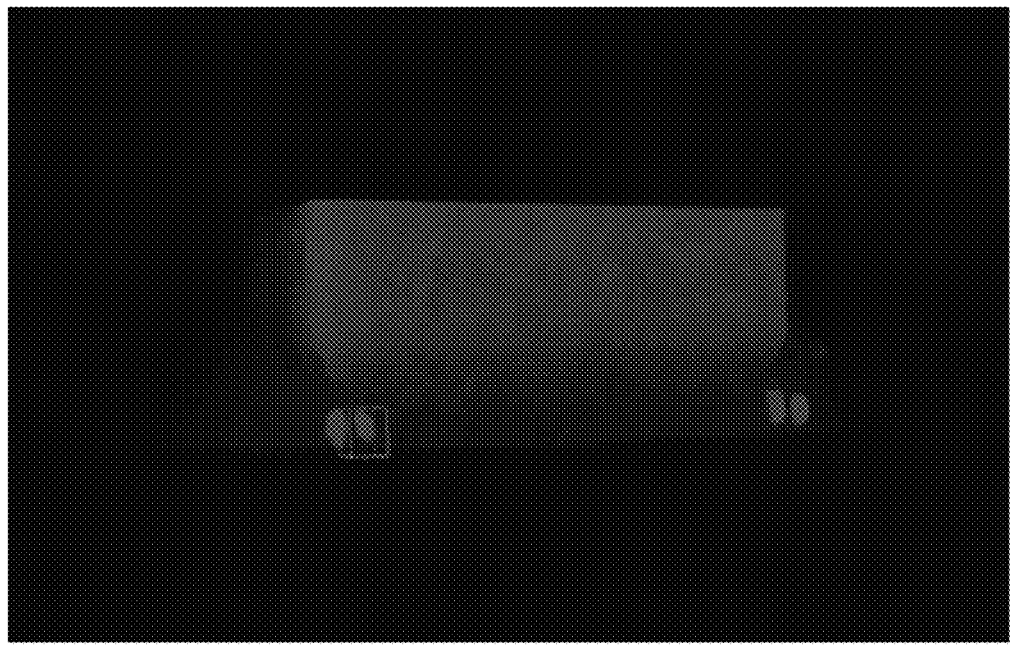
FIG. 15 illustrates an example of a measurement of properties of fiducials in a reconstructed volume, where the fiducials are at known locations.
Figure 16:
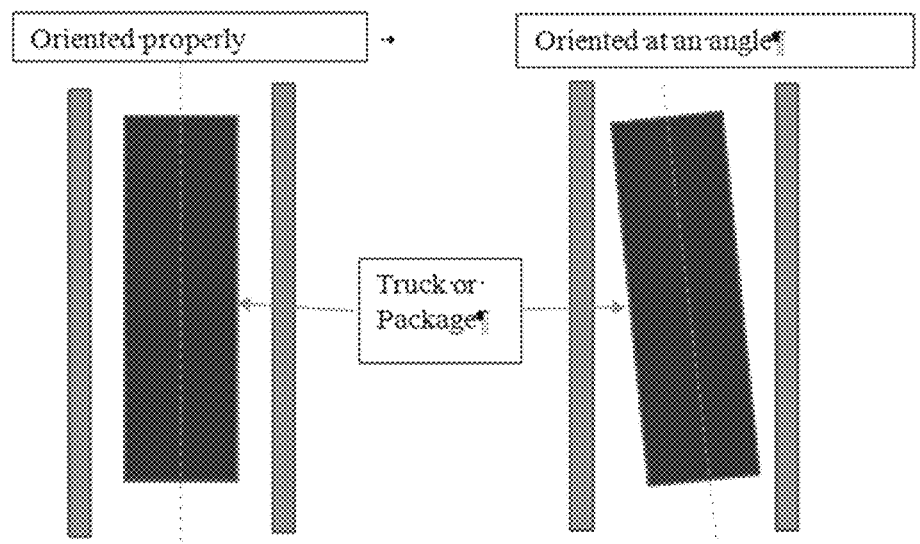
FIG. 16 illustrates an example of finding a correct orientation of a truck/container within a reconstructed volume.

The sequence of morphological dilation and morphological erosion operators can be followed by a connected-component analysis (e.g., similar to what is described with relation to step 208 of FIG. 2 above). During this step, each cluster of candidate voxels of the fiducials of the reconstructed volume can be marked or labeled with a common identifier, such as a unique numeral value, to identify a unique object. As described above, a structuring element (or kernel) in a shape such as a sphere or a cube can be used be used to ensure full or partial connectedness of each voxel to adjacent voxels for the connected-component analysis. FIG. 14 illustrates an example of automatically locating the fiducials in a reconstructed volume, for example, where the fiducials are of a known size. For example, each unique object identified in the connected-component analysis can automatically be compared to the known size to determine if the object is a fiducial, and the location of each such fiducial can be determined. The properties of these fiducials can be determined. FIG. 15 illustrates an example of the measurement of the properties of the fiducials in a reconstructed volume, where the fiducials are at known locations. In FIG. 15, only one window is shown, however, the properties of all of the fiducials can be measured. Once these image processing techniques/algorithms have been used, the corners (based on the locations and properties of the fiducials) of the volume pertaining to the container or package or inspection object can be detected to give the location, corners, and boundary of the container or package or inspection object and the orientation of the container or package or inspection object, or a combination of these properties. FIG. 16 illustrates an example of finding the correct orientation of a truck/container within a reconstructed volume. In FIG. 16, the right image shows the orientation of the truck/container within the detector volume, while the left image shows a corrected orientation of the truck/container after the image processing techniques/algorithms have been used on the reconstructed volume associated with the right image.

In some embodiments, the above-described embodiments may include an image subtraction operation that uses an image of the inspection volume without the container or package or inspection object to subtract the background from the container or package or inspection object to isolate the container or package or inspection object.

Figure 19:
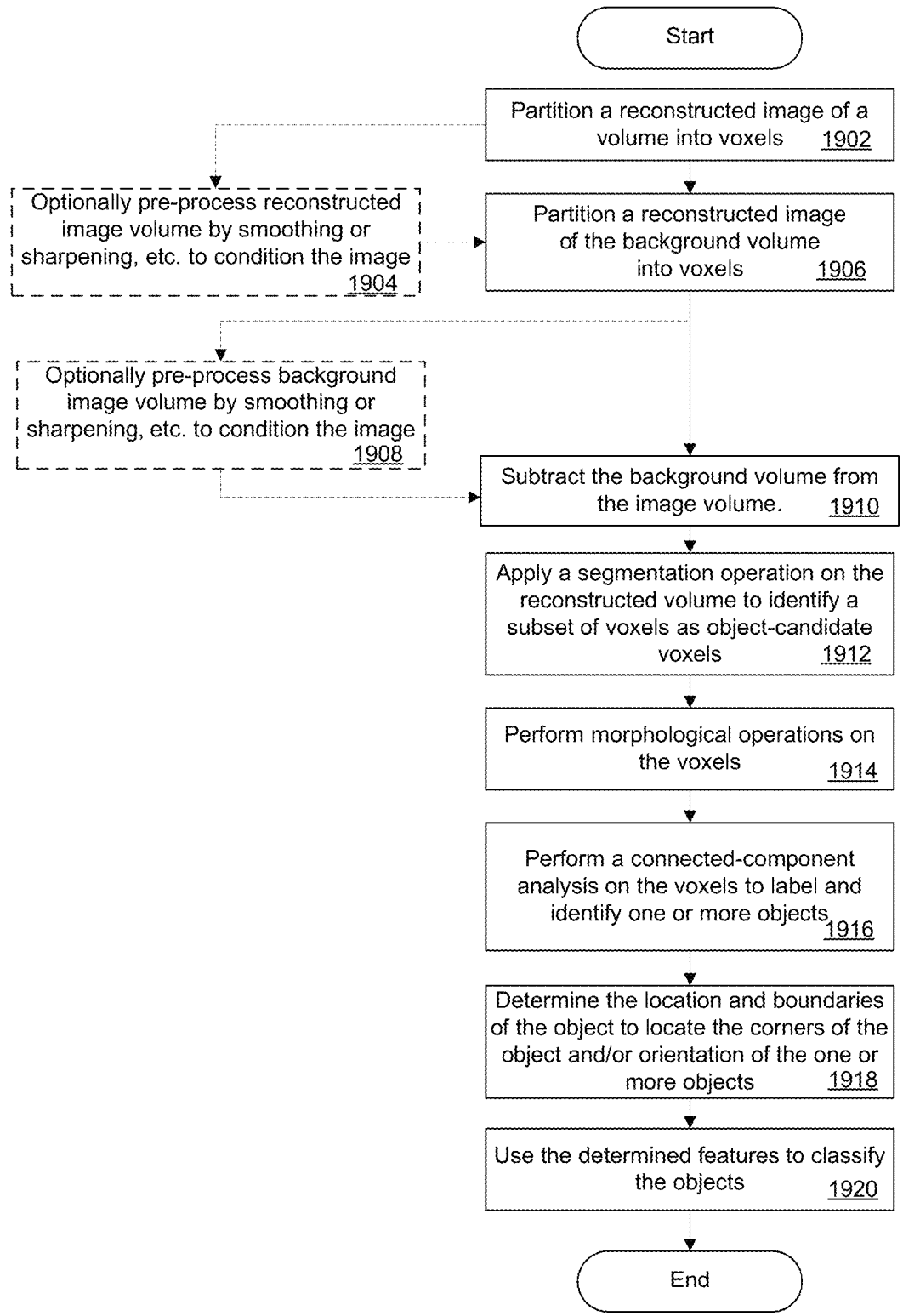
FIG. 19 presents a flowchart illustrating an exemplary process of analyzing a reconstructed volume from cosmic ray imaging measurements using image processing/computer vision techniques to determine the location, corner, and boundaries, or the orientation of an object, or a combination of these properties.

FIG. 19 presents an exemplary flowchart illustrating an exemplary process of analyzing a reconstructed volume from cosmic ray imaging measurements using image processing/computer vision techniques to determine the location, corners, and boundaries, or the orientation of an object, or a combination of these properties. Some of the process described with respect to FIG. 19 can be optionally performed as described below and identified in FIG. 19 using dashed lines. The object may be a container or a package or an inspection object. During operation, the reconstructed image of a volume can be partitioned into voxels with each voxel associated with an intensity value (1902). Optionally, the reconstructed image volume can be pre-processed by smoothing or sharpening, etc. to condition the image (1904). A different reconstructed image of the volume can be partitioned into voxels (1906) for the background. Similar to the image volume, the reconstructed background image volume can be optionally pre-processed by smoothing or sharpening (1908). The background image volume can be subtracted from the image volume (containing the inspection object) (1910). For example, the voxel values in the image volume from operation 1902 can be smoothed, using image processing smoothing techniques. In addition, the image volume from operation 1902 can undergo a sharpening operation, using image processing sharpening techniques, to sharpen the details of the inspection object. The resulting image can contain the smoothed and sharpened voxels of the inspection object. Additionally, a previously acquired reconstructed image volume of the background, which does not contain the inspection object, can optionally be used to further process the image volume at operation 1904. For example, the voxel values in the previously acquired background image volume can be smoothed, using image processing smoothing techniques, and this background image volume can undergo a sharpening operation, using image processing sharpening techniques, to sharpen the details of the inspection object. The background image volume can be subtracted from the image volume before the inspection object or its features are detected. In some embodiments, the image volume may be pre-processed without the background volume being partitioned into voxels, the background image volume being pre-processed, or the subtraction being performed.

A segmentation operation can be applied on reconstructed volume to identify qualified voxels as candidate voxels to objects (1912). In some embodiments, the segmentation operation can use a high threshold and low threshold to label each voxel as either an object-candidate voxel or a non-object voxel. A voxel with an intensity value below the low threshold or a value above the high threshold can be labeled with a binary value (1 or 0) to indicate that the voxel is not a candidate of an object (i.e., non-object voxel). A voxel with an intensity value between the low threshold and the high threshold can be labeled with an opposite binary value (0 or 1) to indicate that the voxel is a candidate of an object (i.e., object-candidate voxel).

After the segmentation operation on the reconstructed volume, one or more binary morphological operations can be applied to the binary-valued voxels to improve connectedness of the binary-valued voxels (1914). Applying the one or more binary morphological operations can be used to "fill holes" inside a cluster of object-candidate voxels that belong to the same object, i.e., reversing the binary values of those non-object voxels (i.e., incorrectly segmented) if they are surrounded by object-candidate voxels. In filling the holes, the process can be used to identify additional object-candidate voxels which has been falsely labeled as non-object voxels to improve connectedness of clusters of the object-candidate voxels and clusters of non-object voxels.

In one embodiment, the binary morphological operations can include a morphological erosion operation followed by a morphological dilation operation (referred to as "morphological open process"). In another embodiment, the binary morphological operations can include a morphological dilation operation followed by a morphological erosion operation (referred to as "morphological close process"). In some embodiments, the binary morphological operations can include other combinations of morphological dilation operation and morphological erosion operation. For example, when performing a morphological close process, a morphological dilation operation can apply a structuring element (or a kernel) in a shape such as a sphere or a cube on the segmented volume. The structuring element includes a group of voxels, and when the structuring element is applied to a given voxel in the segmented volume, all voxels within the space of the structuring element may get the binary value of the voxel being operated on. The operation of applying a structuring element can be repeated for all the voxels in the segmented volume. While the morphological dilation operation improves the connectedness of each voxel to its adjacent voxels by reversing incorrectly-segmented adjacent voxels, this operation can also create an artificial "layer" of object-candidate voxels to each potential object. A morphological erosion operation can be applied on the processed voxels in the segmented volume to remove this artificial "layer" of voxels.

After improving the connectedness of binary-valued voxels in the segmented volume, the process can be used to identify unique objects within the segmented volume by applying a connected-component analysis to the binary-valued voxels to label and identify one or more objects (1916). During identification of the unique objects within the segmented volume, each cluster of connected object-candidate voxels can be marked with a common identifier, such as a unique numeral value, to identify a unique object. For example, different clusters of connected object-candidate voxels can be marked sequentially as "1," "2," "3," etc. In one embodiment, when marking a cluster of voxels as the same object, when a voxel is found to be not connected to the object but satisfy the criteria for the connectivity type of that object, the voxel can be marked as the object. The criteria used can include both full and partial connectedness. In one embodiment, full connectedness can refer to that the voxel in question is connected to all the adjacent voxels (i.e., horizontally, vertically and diagonally in three dimensional (3D). Hence, in the case of a radius of 1 voxel, the full connectedness can consider a total of 27 connected voxels. Partial connectedness refers to other configurations, for example, the voxel in question is connected to all the other voxels horizontally and vertically but not diagonally, or the voxel can be connected diagonally but not in the horizontal or vertical directions.

When identifying objects within the segmented volume, a structuring element (or a kernel) in a shape such as a sphere or a cube can be used to ensure full or partial connectedness of each voxel to adjacent voxels. Once the objects is detected from the reconstructed volume, feature acquisition operations can be performed on each detected object based at least on the original voxel intensity values (1918). At operation 1918, the location and boundaries of the object can be determined and used to locate the corners or orientation of the object. In some embodiments, at operation 1918, the edges of the object can be determined prior to determining the location and boundaries of the object. For example, edge detection algorithms can be used to determine the locations of the edges of the object, and the locations of the edges may determine the boundaries of the object. In addition, the location and boundaries of the object can be used to determine the locations of the corners of the object. In some embodiments, at operation 1918, the relative position of some parts of the object can be determined relative to the other parts of the object to aid in the determinations of the location, boundaries, or corners, or orientation of the object, or a combination of these properties. In some embodiments, the locations of the fiducials of the object can be determined and used to aid in the determinations of the location and boundaries, or its corners, or orientation of the object, or a combination of these properties. The extracted features can be used to classify the object, determine the location, boundaries, or corners, or orientation of the object, or a combination of these properties (1920).

Some of the techniques described in FIG. 19 can be made optional, or executed or performed in any order or sequence not limited to the order and sequence shown and described in the preceding figures. Additionally, some of the above operations can be executed or performed substantially simultaneously where appropriate or in parallel to reduce latency and processing times. The operations of the techniques described in FIG. 2 may be combined with or may replace any of the steps of the techniques described in FIG. 19.

The above steps of the image processing techniques described in the preceding embodiments and in FIG. 19 can be executed or performed by any suitable image processing mechanism, which can be hardware or software based. For example, the operations of the image processing techniques can be executed or performed by a processor internal or external to the cosmic ray detection system or any type of signal processing unit, such as signal processing unit 140.

While various examples and implementations of the disclosed image processing, object detection, feature extraction techniques are described in the context of the reconstructed muon images, these disclosed techniques are also applicable to analyzing reconstructed cosmic-ray electron images and other reconstructed charged particle images obtained from other types of cosmic-ray tomography systems. Moreover, the disclosed techniques are also applicable to analyzing reconstructed active electron (i.e., using active electron sources) scanning images or active proton (i.e., using active proton sources) scanning images, and other charged particle scanning images obtained from other types of active charged particle tomography systems. Hence, the disclosed techniques are not limited to analyzing reconstructed muon images.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendices.

What is claimed is:

1. A method for analyzing a reconstructed charged particle image of a volume from charged particle detector measurements to determine a location and boundaries of at least one object associated with the volume, the method comprising:
    performing a segmentation operation on the reconstructed charged particle image of the volume, wherein the segmentation operation identifies a first set of voxels of the reconstructed charged particle image of the volume as object candidate voxels and identifies a second set of voxels as non-object voxels, wherein
    the first set of voxels have intensity values that fall between a high threshold and a low threshold, and
    the second set of voxels have intensity values above the high threshold or below the low threshold;
    identifying additional object candidate voxels from the second set of voxels to fill holes of the first set of voxels;
    locating edges of the object to allow determining an extent and an orientation of the object; and
    based on location of the edges, determining the location, boundaries, and corners of the object.

2. The method of claim 1, wherein the object includes at least one container; and
    wherein determining the location, boundaries and corners of the object includes determining location, boundaries and corners of the at least one container in addition to location, boundaries and corners of contents of the at least one container.

3. The method of claim 1, wherein the object includes at least one package; and
    wherein determining the location, boundaries and corners of the object includes determining location boundaries and corners of contents of the at least one package.

4. The method of claim 1 wherein identifying additional object candidate voxels comprises:
    performing a connected-component analysis on the identified object-candidate voxels.

5. The method of claim 4 further comprising:
    prior to performing the connected-component analysis on the identified object-candidate voxels, performing a morphological operation on the constructed charged particle image.

6. The method of claim 5, wherein performing the morphological operation on the reconstructed charged particle image involves applying a sequence of morphological dilation operations and morphological erosion operations to the at least one of the object-candidate voxels.

7. The method of claim 1 further comprising:
    determining a relative position of some parts of the object relative to other parts of the object.

8. The method of claim 1 further comprising:
    determining locations of the previously segmented fiducials by computing the center of mass of each fiducial and computing the center of mass of the one or more objects.

9. The method of claim 1, wherein the reconstructed charged particle image includes one of:
    a cosmic-ray muon image;
    a cosmic-ray electron image; or
    a combined cosmic-ray muon and cosmic-ray electron image.

10. The method of claim 1, comprising:
    determining the orientation of the object based on the location of the edges.

11. A system for analyzing a reconstructed charged particle image of a volume from charged particle detector measurements to determine a location and boundaries of at least one object associated the volume, the system comprising:
    a processor;
    a memory; and
    an image processing mechanism coupled to the processor and the memory, wherein the image processing mechanism is configured to:
        perform a segmentation operation on the reconstructed charged particle image of the volume, wherein the segmentation operation identifies a first set of voxels of the reconstructed charged particle image of the volume as object candidate voxels and identifies a second set of voxels as non-object voxels, wherein
        the first set of voxels have intensity values that fall between a high threshold and a low threshold, and
        the second set of voxels have intensity values above the high threshold or below the low threshold;
        identify additional object candidate voxels from the second set of voxels to fill holes of the first set of voxels;
        locate edges of the object to allow a determination of an extent and an orientation of the object and
        based on location of the edges, determine the location, boundaries and corners of the object.

12. The system of claim 11, wherein the image processing mechanism is configured to determine the orientation of the object in addition to the location, boundaries and corners, based on the location of the edges.

13. The system of claim 11, wherein the object includes at least one container and determining the location, boundaries and corners of the object includes determining a location, boundaries and corners of the at least one container in addition to a location, boundaries and corners of contents of the container.

14. The system of claim 11, wherein the object includes at least one package and determining the location and boundaries of the object includes determining boundaries of contents of the at least one package.

15. The method of claim 1, further comprising determining an average intensity of the connected voxels within the object and a variance of voxel intensity that describes how much voxel intensities vary within the object.

16. The system of claim 11, wherein the image processing mechanism is further configured to determine an average intensity of the connected voxels within the object and a variance of voxel intensity that describes how much voxel intensities vary within the object.

17. The system of claim 11, wherein the image processing mechanism is further configured to:
   perform a morphological operation on at least one of the object candidate voxels; and
   perform a connected-component analysis on at least one of the object candidate voxels after the morphological operation.

* * * * *

UNITED STATES PATENT AND TRADEMARK OFFICE
CERTIFICATE OF CORRECTION

PATENT NO. : 10,115,199 B2
APPLICATION NO. : 14/876380
DATED : October 30, 2018
INVENTOR(S) : Rohit Patnaik It is certified that error appears in the above-identified patent and that said Letters Patent is hereby corrected as shown below:

In the Specification

Column 9, Line 27, delete "$\Delta\theta=0.070.$" and insert --$\Delta\theta=0.070.$--, therefor.

Column 20, Line 58, delete "MaxPoCA=MAX(PoCA_Values)," and insert --$MaxPoCA = MAX(PoCA\_Values_i)$,--, therefor.

Column 22, Line 3, delete "BoundaryLaverAvg2:" and insert --BoundaryLayerAvg2:--, therefor.

Column 23, Lines 28-30, delete "$PoCAEnergy=\Sigma_{i=1}^{N}((PoCA\_Value_i - PoCA\_Value_c)^2 * \sqrt{(x_c-x_i)^2+(y_c-y_i)^2+(z_c-z_i)^2})$," and insert --$PoCAEnergy = \sum_{i=1}^{N}((PoCA\_Value_i - PoCA\_Value_c)^2 * \sqrt{(x_c-x_i)^2+(y_c-y_i)^2+(z_c-z_i)^2})$, --, therefor.

Column 24, Line 55, delete "$Moments=\Sigma_{i=1}^{N}(I_i * \sqrt{(x_c-x_i)^2(y_c-y_i)^2+(z_c-z_i)^2})$," and insert --$Moments = \sum_{i=1}^{N}(I_i * \sqrt{(x_c-x_i)^2+(y_c-y_i)^2+(z_c-z_i)^2})$, --, therefor.

In the Claims

Column 34, Line 58, Claim 11, delete "object and" and insert --object; and--, therefor.

Signed and Sealed this
Third Day of December, 2019

Andrei Iancu
*Director of the United States Patent and Trademark Office*